United States Patent
Rameau et al.

(10) Patent No.: US 8,983,805 B2
(45) Date of Patent: Mar. 17, 2015

(54) MODELED OBJECT UPDATING

(75) Inventors: Jean-François Rameau, Lisses (FR); Jean-Michel Houdouin, La Garenne Colombes (FR); Jean-Baptiste Janvier, Paris (FR); Jadwiga Maria Morawska, Courbevoie (FR)

(73) Assignee: Dassault Systemes, Velizy Villacoublay (FR)

( * ) Notice: Subject to any disclaimer, the term of this patent is extended or adjusted under 35 U.S.C. 154(b) by 637 days.

(21) Appl. No.: 13/325,885

(22) Filed: Dec. 14, 2011

(65) Prior Publication Data

US 2012/0173212 A1 Jul. 5, 2012

(30) Foreign Application Priority Data

Dec. 30, 2010 (EP) .................................... 10306543

(51) Int. Cl.
*G06F 17/50* (2006.01)
*G06F 7/60* (2006.01)
*G09G 5/00* (2006.01)
(Continued)

(52) U.S. Cl.
CPC .............. *G06F 17/50* (2013.01); *G06T 17/10* (2013.01); *G06T 19/20* (2013.01); *G06T 2219/2021* (2013.01); *G06F 2217/04* (2013.01)
USPC .................................. 703/1; 703/2; 345/629

(58) Field of Classification Search
USPC .......................................... 703/2, 1; 345/629
See application file for complete search history.

(56) References Cited

U.S. PATENT DOCUMENTS

| 5,850,535 A | 12/1998 | Maystrovsky et al. |
| 6,341,291 B1 | 1/2002 | Bentley et al. |

(Continued)

FOREIGN PATENT DOCUMENTS

| EP | 1501026 A1 | 1/2005 |
| EP | 2028623 A1 | 2/2009 |
| WO | WO 2008/127254 A1 | 10/2008 |

OTHER PUBLICATIONS

Laakko et al., Feature Models for Design and Manufacturing, Jan. 2-5, 1990, Twenty-Third Annual Hawaii International Conference on System Sciences Proceedings, vol. ii, pp. 445-454.*

(Continued)

*Primary Examiner* — Kamini S Shah
*Assistant Examiner* — Juan Ochoa
(74) *Attorney, Agent, or Firm* — Hamilton, Brook, Smith & Reynolds, P.C.

(57) ABSTRACT

Provided is a computer-implemented method for updating a 3D model. The method comprises providing an operation undergone by the 3D model, an old input graph of the 3D model before undergoing the operation, an old output graph of the 3D model corresponding to an application of the operation to the old input graph, and a new input graph of the operation. The new input graph is generated as a result of a modification of the 3D model. The method also comprises computing a double push-out rewriting rule that specifies a part of the old input graph to be replaced, a part of the new input graph to replace the part of the old input graph. The rewriting rule also specifies an interface which is a part common to the part of the old input graph, the part of the new input graph, and the old output graph. The method further comprises applying the rewriting rule directly on the old output graph. This transforms the old output graph to a new output graph representing an updated 3D model of the real world object. The method is an improvement to updating a 3D model in a CAD system.

12 Claims, 19 Drawing Sheets

(51) Int. Cl.
G06T 17/10 (2006.01)
G06T 19/20 (2011.01)

(56) References Cited

U.S. PATENT DOCUMENTS

| | | | |
|---|---|---|---|
| 7,079,114 B1 | 7/2006 | Smith et al. | |
| 7,313,504 B2* | 12/2007 | Chin et al. | 703/1 |
| 7,755,621 B2* | 7/2010 | Kripac | 345/420 |
| 7,913,190 B2 | 3/2011 | Grimaud et al. | |
| 8,248,407 B2 | 8/2012 | Deslandes | |
| 8,305,376 B2 | 11/2012 | Ran et al. | |
| 8,429,174 B2 | 4/2013 | Ramani et al. | |
| 2003/0085889 A1 | 5/2003 | Chin et al. | |
| 2007/0291028 A1 | 12/2007 | Kripac | |
| 2008/0140732 A1 | 6/2008 | Wilson et al. | |
| 2008/0255809 A1 | 10/2008 | Ran et al. | |
| 2008/0309678 A1 | 12/2008 | Reghetti et al. | |
| 2010/0274818 A1 | 10/2010 | Chauvin et al. | |
| 2012/0109589 A1 | 5/2012 | Thompson et al. | |
| 2012/0109591 A1 | 5/2012 | Thompson et al. | |
| 2012/0173208 A1* | 7/2012 | Houdouin et al. | 703/1 |
| 2012/0316841 A1* | 12/2012 | Rameau et al. | 703/1 |
| 2013/0311450 A1 | 11/2013 | Ramani et al. | |

OTHER PUBLICATIONS

Tom Mens, A Formal Foundation for Object-Oriented Software Evolution, 2001, pp. 1-4.*
Brunet et al., A manifesto for model merging, 2006, International Workshop on Global Integrated Model Management Proceedings, pp. 5-11.*
West and Kahl, A generic graph transformation, visualisation, and editing framework in Haskell, 2009, ECEASST 18, pp. 1-18.*
Rho and Wu, An efficient version model of software diagrams, 1998, Asia-Pacific Conference on Software Engineering, pp. 236-243.*
Godfrey and Zou, Using Origin Analysis to Detect Merging and Splitting of Source Code Entities, 2005, IEEE Trans. on Software Engineering, 31(2), pp. 166-181.*
Wolfram Kahl, "Co-tabulations, Bicolimits and Van-Kampen Squares in Collagories", 2010, vol. 29: Graph Transformation and Visual Modeling Techniques, pp. 1-15.*
Anand and Kahl, Code graph transformations for verifiable generation of SIMD-parallel assembly code, 2008, Applications of Graph Transformations with Industrial Relevance Lecture Notes in Computer Science vol. 5088, pp. 217-232.*
Kahl, Refactoring heterogeneous relation algebras around ordered categories and converse, 2004, Journal on Relational Methods in Computer Science, vol. 1, pp. 277-313.*
Drewes et al., Shaped Generic Graph Transformation, 2008, Applications of Graph Transformations with Industrial Relevance Lecture Notes in Computer Science vol. 5088, pp. 201-216.*
European Search Report for European Application No. EP 10306542 dated May 25, 2011.
Sadeghi, M. et al., "Support for effective change management in product data management systems," Paper presented at Computers and Industrial Engineering, 2009, International Conference on IEEE, Piscataway, NJ, pp. 1514-1519 (Jul. 6, 2009).
Yan, S., et al., "An asynchronous CAD collaborative design model", Paper presented at Computer Application and System Modeling (ICCASM), 2010 International Conference on IEEE, Piscataway, NJ, pp. V6-563-V6-566 (Oct. 22, 2010).
Ebrahim, Batgheri, et al., "An exploratory classification of applications in the realm of collaborative modeling and design," Information Systems and E-Business Management, 8(3):257-286 (Nov. 15, 2008).
European Search Report for European Patent Application EP 10306544 dated Jun. 21, 2011.
Schmidt, R., et al., "Interactive implicit modeling with hierarchical spatial caching," Fibres and Optical Passive Components, 2005, pp. 104-113 (Jun. 13, 2005).
Pariente, F., et al., "Incremental and localized update of convex decomposition used for form feature recognition," Computer Aided Design, 28(8):589-602 (Aug. 1, 1996).
European Search Report for European Application EP 10306543 dated May 27, 2011.
Kahl, W., et al., "Amalgamating Pushout and Pullback Graph Transformation in Collagories," Lecture Notes in Computer Science, vol. 6372, pp. 362-378 (2010).
Jahnke, J.H., et al., "A case study in Supporting Schema Evolution of Complex Engineering Information Systems," Paper presented at the meeting of Computer Software and Applications Conference, 1998, COMPSAC'98 Proceedings, The Twenty-Second Annual International Vienna, pp. 513-520 (Aug. 19, 1998).
Rodden, et al., "A Survey of CSCW Systems", Interacting with Computers, 3(3):319-353 (Dec. 1, 1999).
Nan, Niu, et al., "A Category-theoretic Approach to Syntactic Software Merging", Paper presented at the meeting of Software Maintenance, 21$^{st}$ IEEE International Conference on Sep. 25-30, 2005, Piscataway, NJ, pp. 197-206 (Sep. 25, 2005).
Cheung, Gary K. L., et al., "Incremental Rendering of Deformable Trimmed NURBS Surfaces," Paper presented at the meeting of Proceedings of the ACM Symposium on Virtual Reality Software and Technology, pp. 48-55 (Jan. 1, 2003-Mar. 10, 2003).
Woerdenweber, B., "Surface Triangulation for Picture Production," IEEE Computer Graphics and Applications, 3(8):45-51 (Nov. 1, 1983).
Guo, B. et al., "Local Shape Control for Free-form Solids in Exact CSG Representation," Computer Aided Design, 28(6):483-493 (Jun. 7, 1996).
Hsu, C., et al., "A Constraint-Based Manipulator Toolset for Editing 3D Objects," Paper presented at meeting on Proceedings of the Fourth Symposium on Solid Modeling and Applications Atlanta, GA, SYMP(4):168-180 (May 14, 1997).
Sohrt, W., et al., "Interaction with Constraints in 3D Modeling," Paper presented at meeting on Symposium on Solid Modeling Foundations and CAD/CAM Applications, pp. 387-396, (Jun. 5, 1991).
Tilove, R.B., "A Null-Object Detection Algorithm for Constructive Solid Geometry," Communication of the ACM, 27(7):684-694 (Jul. 1984).
Mens, T., "On the Use of Graph Transformations for Model Refactoring," University of Mons-Hainaut, Belgium, Lecture Notes in Computer Science, 2006, vol. 4143, Generative and Transformational Techniques in Software Engineering 2005, pp. 219-257 (2006).
Diskin, Z. et al., "Scenario Integration via Higher-Order Graphs," Technical Report No. 2006-517, Queens University, Kingston, Ontario, Canada (2006).
Cazals, F., et al., "Reporting Maximal Cliques: New Insight into an Old Problem," INRIA research report No. 5615, France (Jan. 2007).
Wiemann, Helge, "Theory of Graph Transformations." (1995), http://www.informatik.uni-bremen.de/st/lehre/Artefakt/Seminar/Ausarbeitungen/04_Theorie_Graphtransformationen.pdf.
Kahl, W., "A Relation-Algebraic Approach to Graph Structure Transformation", Department of Computing and Software, McMaster University, pp. 1-14, 2002.

* cited by examiner

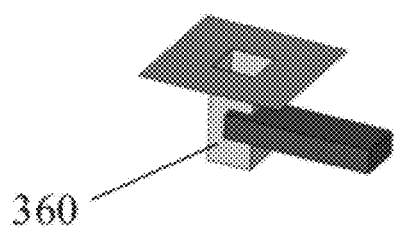
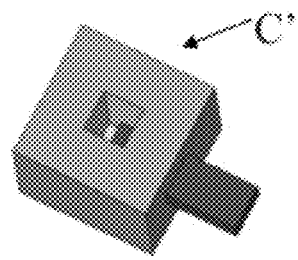
FIG. 36    FIG. 37
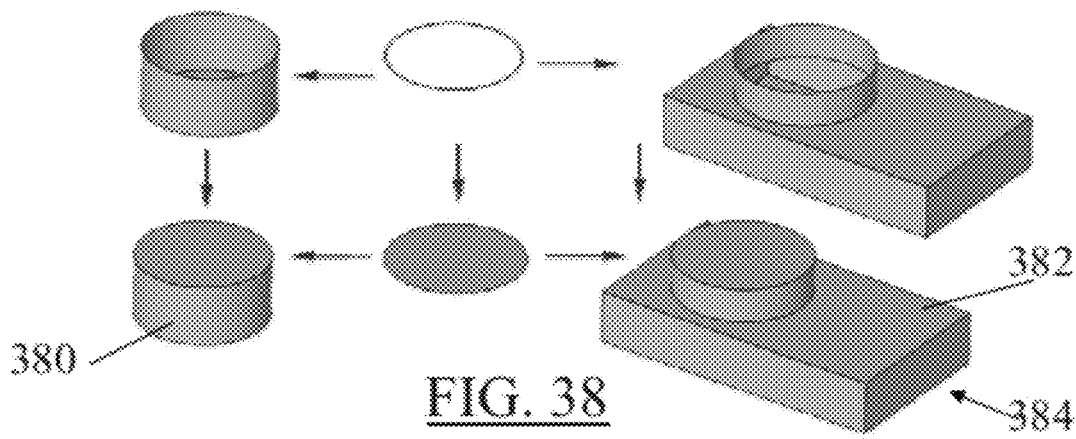
FIG. 38
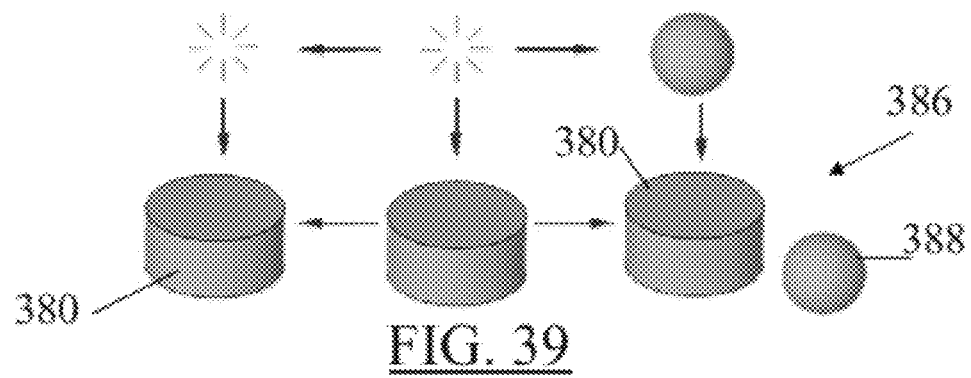
FIG. 39

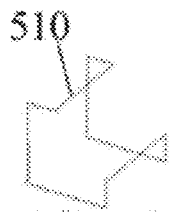
FIG. 50    FIG. 51    FIG. 52
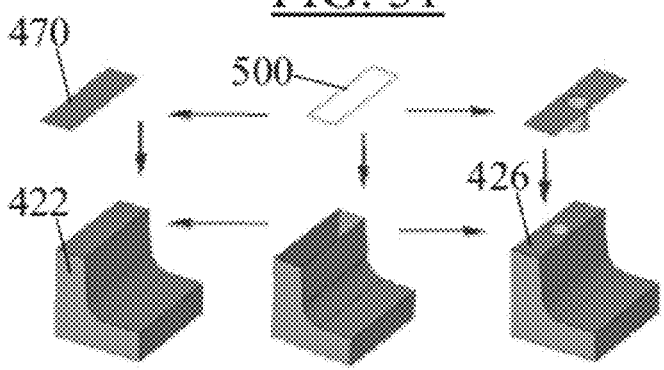
FIG. 53
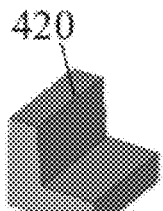 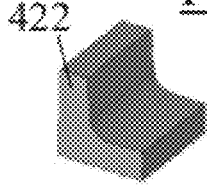 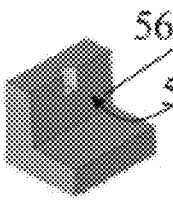 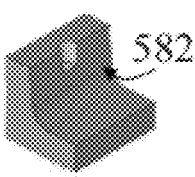
FIG. 54    FIG. 55    FIG. 56    FIG. 57
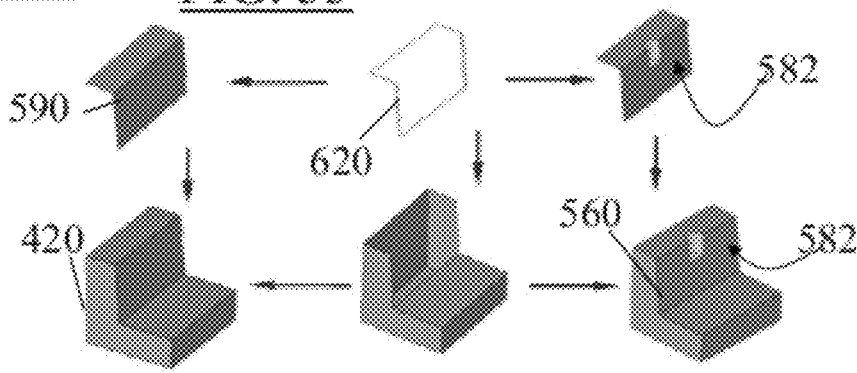
FIG. 58

 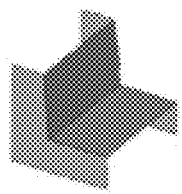 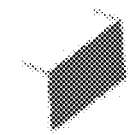
FIG. 59  FIG. 60  FIG. 61
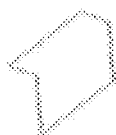 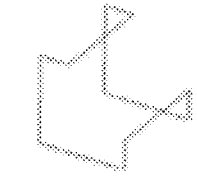 
FIG. 62  FIG. 63  FIG. 64
FIG. 65
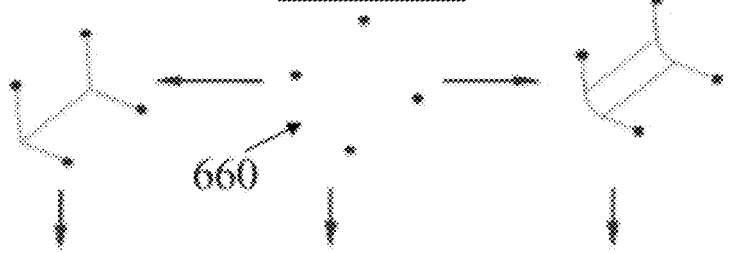
FIG. 66

MODELED OBJECT UPDATING

RELATED APPLICATION(S)

This application claims priority under 35 U.S.C §119 or 365 to European Application No. 10306543.9, filed Dec. 30, 2010.

The entire teachings of the above application(s) are incorporated herein by reference.

FIELD OF THE INVENTION

The invention relates to the field of computer programs and systems, and more specifically to a method, system and program for updating a modeled object.

BACKGROUND

Computer-aided techniques are known to include Computer-Aided Design or CAD, which relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations.

A number of systems and programs are offered on the market for the design of objects (or parts) or assemblies of objects, forming a product, such as the one provided by Dassault Systemes under the trademark CATIA. These CAD systems allow a user to construct and manipulate complex three dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are mostly specifications of geometry. Specifically, CAD files contain specifications, from which geometry is generated, which in turn allow for a representation to be generated. Geometry and representation may be stored in a single CAD file or multiple ones. CAD systems include graphic tools for representing the modeled objects to the designers; these tools are dedicated to the display of complex objects—the typical size of a file representing an object in a CAD system being in the range of one Megabyte per part, and an assembly may comprise thousands of parts. A CAD system manages models of objects, which are stored in electronic files.

Also known are Product Lifecycle Management (PLM) solutions, which refer to a business strategy that helps companies to share product data, apply common processes, and leverage corporate knowledge for the development of products from conception to the end of their life, across the concept of extended enterprise. By including the actors (company departments, business partners, suppliers, Original Equipment Manufacturers (OEM), and customers), PLM may allow this network to operate as a single entity to conceptualize, design, build, and support products and processes.

Some PLM solutions make it for instance possible to design and develop products by creating digital mockups (a 3D graphical model of a product). The digital product may be first defined and simulated using an appropriate application. Then, the lean digital manufacturing processes may be defined and modeled.

The PLM solutions provided by Dassault Systemes (under the trademarks CATIA, ENOVIA and DELMIA) provides an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Such PLM solutions comprise a relational database of products. The database comprises a set of textual data and relations between the data. Data typically include technical data related to the products said data being ordered in a hierarchy of data and are indexed to be searchable. The data are representative of the modeled objects, which are often modeled products and processes.

Product lifecycle information, including product configuration, process knowledge and resources information are typically intended to be edited in a collaborative way and in a dynamic way. For this reason notably, modeled objects are intended to be modified a certain number of times after they have been first created.

Any 3D object that is supposed to fit user defined specifications can be simulated through a virtual part. The virtual part is created by the designer using standard modeling features (extrude, revolute, cut, round etc.) or standard surfacing features (sweep, blend, loft, fill, deform, smoothing etc.). Many CAD systems supporting such modeling functions are history based system. This means that the creation history of design features is saved through an acyclic data flow linking the said features together through input and output links.

The history based modeling paradigm is well known since the beginning of the 80's. A solid part is described by two persistent data representations: history and B-rep (i.e. boundary representation). The B-rep is the result of the computations defined in the history. The shape of the part displayed on the screen of the computer is (a tessellation of) the B-rep. The history of the part is the design intent. Basically, the history gathers the information on the operations which the modeled object has undergone. The B-rep is generally saved together with the history because it is not possible to display complex parts only from the history data. The history is saved together with the B-rep in order to allow design changes of the part according to the design intent.

Another advantage of history based paradigm is for a designer to prepare reusable models. Indeed, other designers can reuse models by changing parameters of the history and letting the system update the new part. Since the update leads to the same result as running again the history with the new parameters, the new part is intrinsically compliant with the new design intent.

In such a context, the speed at which the update is performed is of matter, all the more for complex parts or for applications where many modifications are performed. Several technologies of the prior art for updating the part have been disclosed and are discussed below.

A very popular method to update the shape of a modeled object of which history has been modified is the following. First of all, during the creation phase, all intermediate results of the history are saved. A modification is typically for the designer to change the parameters of a feature, in other words, to change the data of a leaf node of the history. In this case, updating is for the system to replay all operations by following the input-output links from the modified leaf node down to the root node. This method holds as well for a multi-root data flow and when several leaf nodes are modified in one shot. Maystrovsky's U.S. Pat. No. 5,850,535 "Roll-back regeneration in a computer-aided design system" typically describes this technology in the particular case of a linear feature list. This update technology features two drawbacks. Firstly, the update time is closely related to the structure of the history (whether it is a linear list or a well balanced tree for example). In many low end CAD systems, the history is a linear list and its structure is out of the designer's reach. In this case, the update time is proportional to the age of the modified feature. When the history structure is controlled by the user, it is an additional difficulty for the user to balance the said history structure while designing a complex part. An inexperienced designer cannot perform this double task. The second drawback is that many operations are recomputed only because they are on the path (from the modified leaf node down to the root node) while they do not influence the resulting solid. In other words, many operations on the update path are spatially far from the actual change. Deciding whether an operation is meaningful or not during the update is a difficult question. As a consequence, the update is slow.

Another update method is to replay all operations of the history. It avoids intermediate results storage, thus saving memory. Some CAD systems used this method in the early 80's, but it is marginally used nowadays. Replaying the whole history after a modification results in an update time that is proportional to the global complexity of the part and not to the complexity of the modification. The designer expects a "simple" change to be updated faster that a "big" change. This behavior is undesirable from the designer's point of view. As a consequence, the update is slow.

Chin's U.S. Pat. No. 7,313,504 "Model management technology using feature chains" does not require history storage. Persistent data are solid primitives together with their respective "scopes" from which the algorithm dynamically generates a transient history structure. Then, the algorithm traverses this structure to compute the new part after a primitive creation or modification. This technology rebuilds a history structure each time the part is modified. Consequently, the update process requires a computation time that is proportional to the number of primitives and not to the complexity of the modification. A very simple modification would require the same amount of computation than a complex modification, which is not optimal from the designer's point of view. As a consequence, the update is slow.

In yet another technology for updating models based on history, all leaf nodes are solids, and all operations are pure Boolean operations (which are union, subtraction, intersection as opposed to non Boolean operations such as round, fillet, draft angle, tweak, thickness, shell). Given a modification intent, for example changing the size or position of a leaf solid, there exists, by theorem, a 3D volume outside which the resulting solid is invariant. This is the "a priori localization volume". In many cases, this knowledge allows a faster update by simplifying the shape of leaf solids that are spatially far from the change, thus performing trivial or simpler operations to compute the new solid. This technology is inspired by the research paper "A null-object detection algorithm for constructive solid geometry" by R. B. Tilove, Communication of the ACM, July 1984, vol. 27, No 7. This technology features two drawbacks. Firstly, it does not take into account non Boolean operations such as draft angle, round, fillet, shell and thickness which are very popular in mechanical design. The reason is that it is impossible to anticipate how a round (or fillet, draft angle, shell, thickness) will proliferate on the solid due to tangency propagation, which eliminates the a priori localization volume. This restriction to pure Boolean operations is a major drawback in mechanical design and in solid modeling in general because a real life part always features some non Boolean characteristics (round, fillet, shell etc.). Secondly, even in the pure Boolean case, there are examples when this technology is not efficient. Consider for example the solid $S=(X+Y)+Z$ illustrated on FIG. 1 and defined by three primitives X,Y,Z and a linear history tree involving union operations only. Let Y' be the new version of Y, meaning that the modification intent is to replace Y with Y'. According to this technology, the best possible localization volume is $V=(Y'-Y)+(Y-Y')$, as illustrated on FIG. 2. The principle is to write the modified solid $S'=(X+Y')+Z$ as $S'=(S'-V)+(S'\cdot V)=(S-V)+(S'\cdot V)$, which is illustrated on FIG. 3. The first step of the updating process is to compute the B-rep of the invariant portion of the resulting solid S' which is S−V. Then, the history tree of the changed portion of the solid is $S'\cdot V=((X+Y')+Z)\cdot V$. Since this formula is equal to $(((X\cdot V)+(Y'\cdot V))+(Z\cdot V))$, all primitives $\alpha$ such that $\alpha\cdot V=\phi$ are eliminated from the expression of $S'\cdot V$, which hopefully yields a reduced history tree. Finally, the updating process computes the B-rep of the solid corresponding to the reduced history tree and merges this B-rep to the B-rep of the invariant portion S−V, which yields the B-rep of the modified solid. Applied to the primitives illustrated in FIGS. 1-3, it is clear that this does compute the operation +Z because primitive Z overlaps volume V, although it is obviously not necessary to compute the operation +Z. As a consequence, the update is slow, all the more when there are non-Boolean operations in the history.

B-rep modeling is an alternate technology to history based modeling. B-rep modeling does not save the history of the part. Thus, a change is directly and locally performed on the B-rep, by deleting, moving, extrapolating, healing faces, which is very fast compared to history replay. B-rep modeling technology provides a very fast update because there is no history to replay. The first drawback is a lack of semantic. The design intent expressed through the history is lost, and reusing predefined models is not possible. Secondly, not all topological and geometrical changes are possible through B-rep modeling. Finally, a very useful integrity property of history based modeling is that the new part is equal to the part created from scratch with new inputs. B-rep modeling does not guarantee this property. In this technology, there is no need for an update method because the modifications on the model dynamically update it. However, as no information on the operations which the object has undergone is kept, a subsequent modification is actually difficult for the user. Furthermore, B-rep modeling has geometrical and topological restrictions which lead designers to often prefer history based modeling.

Kripac's patent application US2007/0291028 "fast interactive object manipulation" describes a method for real time update of a history based solid. Given the solid primitive to be modified, the algorithm computes a reduced history tree. This reduced history tree is balanced in such a way that the modified primitive is involved in the very last of the last but one operation and is combined to one or two constant solids. The reduced history tree is obtained through algebraic manipulations of the initial history tree. The B-rep representation of the constant solids is computed from scratch. Then, the (hopefully) real time update can start upon user defined changes of the solid primitive. Only interactive manipulation is addressed by this technology, nothing is said about how the modified solid is actually computed for repository purpose. Kripac's algorithm is not compatible with intermediate results saving as described earlier because the history tree is rebalanced for each modification. Beyond the computer time required for algebraic manipulations, the geometrical and topological complexity of the constant solids involved in the reduced history tree is comparable to the complexity of the whole solid. Given that the constant solids are computed from scratch, the consequence is that the reduced history tree step is almost as costly as computing the whole solid from scratch. As a consequence, before the real time capability is available, the designer must wait during a time period that is generally too long. Furthermore, there exists a failure risk because algebraic manipulations may duplicate primitives in the reduced history tree, which causes tangent or locally identical surfaces situations. It is well known that these situations are handled with enormous difficulty by geometrical modelers. Furthermore, the integrity of the data model is not guaranteed because the computation performed by the system to provide the modified solid is totally different from the computation performed to create the solid from the modified primitives through the initial history. As previously mentioned, only interactive manipulation is addressed by this technology. How the final solid is computed before repository saving may need further computation. Drawbacks are thus a costly pre-processing and a potential geometrical fragility. As a consequence, the update is slow.

Solidworks' patent application WO2008/127254 describes a method for "locally updating a three dimensional model". Given a solid defined by a feature list and the corresponding B-rep and given a modified feature, the method determines a subset of features that possibly affect the shape of the solid. These features are related to the modified feature through three kinds of relationships: parent/child relationship, topological adjacency and spatial intersection. Then, topological faces of these features that appear on the solid are removed and/or replaced by faces of modified features. This method is directed to the general case including Boolean (union, subtraction, intersection) and non Boolean operations (round, fillet, draft, thickness, shell etc.). The resulting solid is the same as the solid obtained by regenerating all features from scratch. The first drawback is that in some cases, features are recomputed despite they do not change the resulting solid. The second drawback is that the computing path followed by the system to update the solid is totally different from the computing path to generate the modified solid from scratch. The update performs new computations to get the modified solid, other computations than those performed through a traditional update. For instance, according to page 12, line 11 of WO2008/127254 and referring again to FIGS. 1-3: a "spatial intersection relationship" is identified between the modified feature Y and Z with causes the +Z operation to be replayed, although unnecessary. As a consequence, the update speed can still be increased.

Besides, it has to be noted that graph theory has been discussed in the context of model modification.

The article entitled "On the use of graph transformation for model refactoring" by T. Mens, of the University of Mons-Hainaut, in Belgium, relates to model refactoring, and shows how graph transformation can provide formal support for this activity.

The article entitled "Scenario integration via higher-order graphs", in Technical report No. 2006-517, by Z. Diskin, J. Dingel, H. Liang, from Queen's University, in Kingston, Ontario, Canada, 2006, also presents the use of graph theory for the management of scenarios involving models.

On graph theory specifically, the thesis entitled "A relation-algebraic approach to graph structure transformation", by W. Kahl, from McMaster University in Ontario, Canada (most of the work completed at the Institute for Software Technology of Universität der Bundeswehr München in Germany), 2002, includes a statement about "the categoric approach to graph transformation". It explains basic categorical push-out and pull-back operations as well as the "double push-out" graph rewriting.

However, there still exists a need for improving the update of a modeled object.

SUMMARY OF THE INVENTION

According to one aspect, the invention therefore provides a method for updating a modeled object, the method comprising:
  providing an operation,
  providing:
    an old input graph of the operation,
    an old output graph corresponding to an application of the operation to the old input graph,
    a new input graph of the operation,
  computing a rewriting rule that specifies: (i) a part of the old input graph to be replaced, (ii) a part of the new input graph to replace said part of the old input graph, and (iii) an interface which is a part common to said part of the old input graph, said part of the new input graph, and the old output graph,
  applying the rewriting rule to the old output graph.

In embodiments, the method may comprise one or more of the following features:
  method further comprises (a) computing another rewriting rule that specifies: (i) a second part of the old input graph to be replaced, (ii) a part of the old output graph to replace the other replaced second part of the old input graph, and (iii) another interface which is a part common to the second part of the old input graph and said part of the old output graph, and (b) testing that the rewriting rule and the other rewriting rule are commutative before applying the rewriting rule to the old output graph;
  the testing is performed by comparing an intersection between the replaced and the other replaced to an intersection between the interface and the other interface, the rewriting rule and the other rewriting rule being commutative when the two intersections are equal;
  nodes of the old input graph, of the new input graph, and of the old output graph point to geometric data;
  the old input graph, the new input graph, and the old output graph are at least sub-graphs of boundary-representation graphs;
  the old input graph, the new input graph, and the old output graph are face-edge graphs or edge-vertex sub-graphs of boundary-representation graphs;
  the old input graph, the new input graph, and the old output graph are edge-vertex sub-graphs of boundary-representation graphs, and the method further comprises, prior to the providing of the old input graph, the new input graph, and the old output graph: providing an old face-edge input graph of the operation, the old face-edge input graph being a sub-graph of the boundary-representation graph of which the old input graph is a sub-graph, an old face-edge output graph corresponding to an application of the operation to the old face-edge input graph, the old face-edge output graph being a sub-graph of the boundary-representation graph of which the old output graph is a sub-graph, a new face-edge input graph of the operation, the new face-edge input graph being a sub-graph of the boundary-representation graph of which the new input graph is a sub-graph, computing a face-edge rewriting rule that specifies a face-edge replaced which is a part of the old face-edge input graph to be replaced, a face-edge replacement which is a part of the new face-edge input graph to replace the face-edge replaced, a face-edge interface which is a part common to the face-edge replaced, the second face-edge replacement and the old face-edge output graph, computing another face-edge rewriting rule that specifies another face-edge replaced which is a part of the old face-edge input graph to be replaced, another face-edge replacement which is a part of the old face-edge output graph to replace the other face-edge replaced, another face-edge interface which is a part common to the other face-edge replaced and the other face-edge replacement, and testing that the face-edge rewriting rule and the other face-edge rewriting rule are not commutative;

the method further comprises testing for 3D compatibility between a volume corresponding to the replacement and a volume corresponding to the other replacement;

the operation is a filleting or a rounding operation; and/or the providing an operation, providing the old input graph, the old output graph and the new input graph, and computing the rewriting rule are iterated over historical operations of the modeled object, the operation of each iteration being a respective historical operation.

According to another aspect, the invention further proposes a history-based computer-aided design system comprising:
a) a database storing a 3D modeled object defined by:
a history,
graphs linked to different points of the history,
b) a graphical user interface suitable for performing the above method.

According to another aspect, the invention further proposes a computer program comprising instructions for execution by a computer, the instructions comprising means for performing the above method with a graphical user interface of a computer-aided design system, wherein the system further comprises a database storing a 3D modeled object defined by a history and graphs linked to different points of the history.

According to another aspect, the invention further proposes computer readable storage medium having recorded thereon the above computer program.

BRIEF DESCRIPTION OF THE DRAWINGS

Embodiments of the invention will now be described, by way of non-limiting example, and in reference to the accompanying drawings, where:

FIGS. 28-73 show examples of performing the invention method, FIG. 73 shows a flowchart of an example of the method.

DETAILED DESCRIPTION OF THE INVENTION

Figure 4:
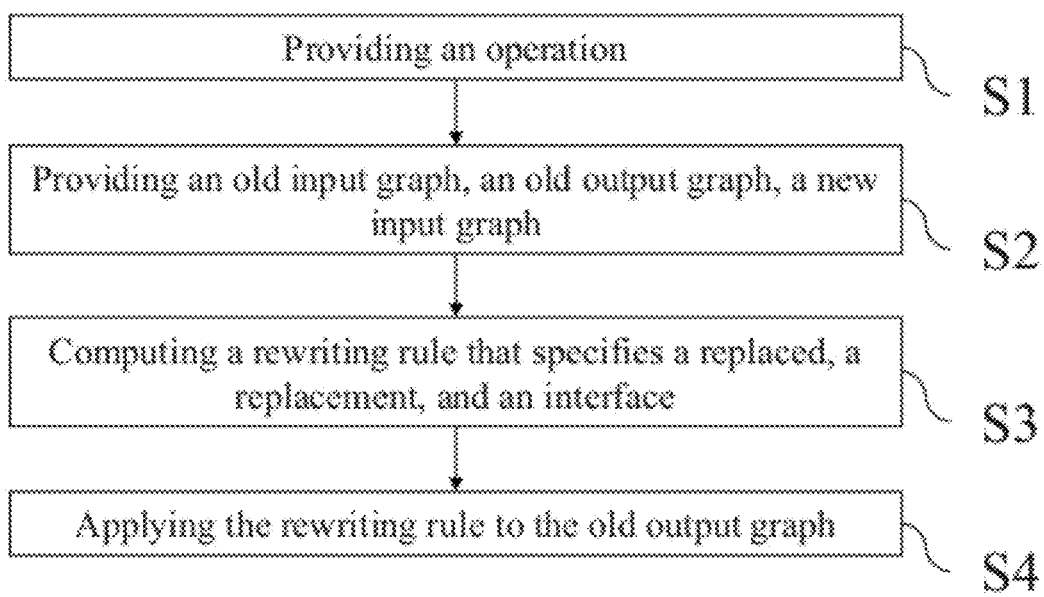
FIG. 4 shows the flowchart of the method of the present invention.

With reference to the flowchart of FIG. 4, it is proposed a method for updating a modeled object. The method comprises providing (S1) an operation. The method also comprises providing (S2) an old input graph of the operation, an old output graph corresponding to an application of the operation to the old input graph, a new input graph of the operation. The method further comprises computing (S3) a rewriting rule that specifies a "replaced". The "replaced" is a part of the old input graph to be replaced. The rewriting rule also specifies a "replacement". The "replacement" is a part of the new input graph to replace the part of the old input graph. The rewriting rule further specifies an "interface". The interface is a part common to the "replaced", the "replacement" and the old output graph. The method then comprises applying (S4) the rewriting rule to the old output graph. Such a method improves the update of a modeled object.

A modeled object is an object modeled by data allowing a computer manipulation of the object. By extension, it designates the data itself. In its broadest lines, the method is intended for updating any type of modeled object, as long as the modeled object is defined by a graph. Thus, in the method, all modeled objects are defined by a respective graph.

The data modeling the modeled object may thus include data representing the graphs. Alternatively, the data modeling the modeled object may include data allowing the retrieval of the graphs. A graph is a structure comprising nodes and arcs, and a relationship wherein each arc is in relation with two nodes. In the context of a computer-implemented method, all these elements (nodes and arcs) may be referenced and pointers may lead to them.

The object may for example be a book. In such a case, the graphs defining the object may be trees wherein nodes represent chapters, parts, paragraphs, sentences, words and the arcs represent the "comprise/comprised by" relationship. In such a case, the method can be used for updating a book which is modified by a writer. The object may also be a 2D drawing, a mathematical formula, an audio file, a video clip.

In the context of applying the method in CAD, the object may typically be a 3D modeled object, e.g. representing a product such as a part or an assembly of parts. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process. The following examples concern a modeled object which is a 3D modeled object defined in a CAD system. However, the following applies to other types of objects as well.

The method is intended for updating a modeled object which has undergone at least one operation. The operation may be any type of operation, as long as it acts on the graph defining the modeled object. As a consequence, the operation has an "input" graph, i.e. the graph defining the object before undergoing the operation, and an "output" graph, i.e. the graph defining the object after undergoing the operation. Notably, the operation may any solid Boolean operation, but also solid non-Boolean operations such as filleting or a rounding operation. The method may indeed also present its advantages in the non Boolean case.

The input graph is at some point modified. Thus, it is referred to "old" input and output graph, i.e. the input and output graphs before modification, and to "new" input and output graphs, i.e. the input and output graphs after modification.

The method comprises providing (S1) the operation. The operation may for example be retrieved or deduced from data modeling the object. This is typically the case of history based systems which keep track of all operations under which an object has gone. In this case, the modification of the modeled object is rendered easier to the designer. Alternatively, the operation may be entered by a user. In this case, memory space is saved.

Similarly, the method also comprises providing (S2) the old input and output graphs of the operation, which may be retrieved, deduced or entered, as for the operation, and the new input graph of the operation, as a result of a modification of the modeled object.

The method further comprises computing (S3) a rewriting rule that specifies a "replaced". The "replaced" is a part of the old input graph to be replaced. The rewriting rule also specifies a "replacement". The "replacement" is a part of the new input graph to replace the part of the old input graph. Basically, the "replaced" and the "replacement" are graphs. The rewriting rule further specifies an "interface". The interface is a part common to the "replaced," the "replacement" and the old output graph.

A rewriting rule is data coding a modification of a graph. The expression "rewriting rule" may correspond here to a "double push-out" (DPO) as defined in the thesis of W. Kahl entitled "A relation-algebraic approach to graph structure transformation", which is based on the theory of categories, and may be designated as such in the following. Basically, a rewriting rule specifies a part of a graph which is to be replaced and its replacement, as well as data allowing the replacing. The method in this example is based on language theory of graph rewriting, which is itself based on the mathematical category theory. The double push-out graph rewriting rule is preferred here as opposed to single push-out or partial morphism. A DPO rule clearly identifies the interface (also called "gluing condition" hereafter) of the rewriting rule, which in turn clearly identifies the invariant portion of the modified graph.

The rewriting rule may also specify morphisms from the first interface to the first replaced and to the first replacement respectively. This is useful in case the interface has different identifiers from the part common to the replaced and the replacement to which it corresponds. Indeed, the modification may change all identifiers, even for nodes and arcs of the graph which are kept. "Morphisms", which are known from the theory of categories, are, in the context of a computer-implemented method, pointers which link the elements of the interface to elements of the replaced and the replacement. Unless otherwise mentioned, all graph morphisms of the method are injections.

In the context of a computer-implemented method, rewriting rules are thus basically a set of instructions for performing logical operations on graphs. Therefore, applying a rewriting rule is done fast.

The method then comprises applying (S4) the rewriting rule to the old output graph. In other words, the old output graph is modified such that the replacement takes the place of the replaced, as instructed by the rewriting rule.

The method allows for computing the new output graph of the operation. Because the method directly acts on the old output graph, i.e. by applying the rewriting rule on the old output graph, it is already a gain in speed. Furthermore, as the method applies a graph rewriting rule and thus performs logical operations, the method is all the faster. Thus, the method allows a fast computation of the new output graph.

Typically, as the one skilled in the art will appreciate, the method is performed through user-interaction with a GUI coupled with a memory which stores the different objects and a processor which performs the computations/determinations/applications of the method, possibly through user command. Such hardware will be detailed later.

An example of the step of computing the rewriting rule is now detailed with reference to FIGS. 5-12. All other rewriting rule computations of the method, if any, may be performed similarly.

In the example, the general process followed for computing a DPO rewriting rule is that the computing (S3) of the rewriting rule specifying a transformation of a first graph e.g. old input graph A into a second graph e.g. new input graph A' comprises determining a common part H between A and A'. The computing also comprises determining a first subtraction A'−H between A' and the common part H, and a second subtraction A−H between A and the common part H. The computing further comprises determining first end nodes Adh(A'−H)∩H which are nodes of the common part H missing from arcs of the first subtraction A'−H, and second end nodes Adh(A−H)∩H which are nodes of the common part H missing from arcs of the second subtraction A−H. The computing further comprises computing an interface L as a union between the first end nodes Adh(A'−H)∩H and the second end nodes Adh(A−H)∩H, a replaced K as a union between the interface L, the second subtraction A−H, and the second end nodes Adh(A−H)∩H, and a replacement M as a union between the interface L, the first subtraction A'−H, and the first end nodes Adh(A'−H)∩H. This allows an efficient and simple retrieval of the rewriting rule in all cases, as only logical operations are involved.

As previously mentioned, the context of the method is defined by the old input graph A and the new input graph A'. A' may be a modified version of A, which may mean that some elements (arcs and/or nodes) of A may be deleted in A' and that some new elements (arcs and/or nodes) may be created in A'. In other words, there may exist a portion of A inside A'. Formally, this is captured by graph H and two morphisms toward A and A' respectively. It is to be however noted that in practice, specific coding for the morphisms may be avoided in the case the elements of A (or A') to be linked to elements of H hold the same identifiers. This set of three graphs and two morphisms is called a "span" (known from the theory of categories) and is noted: A←H→A' (the letters designating the categories and the arrows designating the morphisms). Thus, whenever a "category" is mentioned in the following, it refers to graphs.

The first step in the example of FIGS. 5-12 is to retrieve the DPO rule defined by the span A←H→A'. The DPO rule is the smallest span K←L→M where the gluing condition L (the interface) is a discrete graph and such that A' is written from A through the DPO rule K←L→M. Traditionally, this is summarized by the following diagram, which represents the rewriting rule.

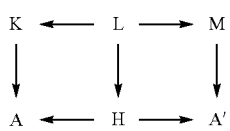

A is the push-out of K and H along L and A' the push-out of M and H along L, which, according to category theory, is noted $A = K \cup_L H$ and $A' = M \cup_L H$. According to the theory of categories, a push-out of two categories along another category is the reunion of the two categories after they are placed in the context of the other category thanks to morphisms from the other category to the two categories. The inverse operation (i.e. finding the other category from the two categories and their reunion) is called the "pull-back".

The principle of the example is to keep only relevant sub-graphs of A, H and A' by removing invariant data. This may be performed through the following steps. Let A−H be the set of arcs and nodes of graph A that are not in graph H. This does not define a new graph since some arcs may have no nodes to connect. In order to define a proper graph, let Adh(A−H) be the set of arcs and nodes A−H enriched with missing end nodes (taken from graph H). Clearly, this defines a graph subtraction. Notation Adh(·) is chosen by topological analogy with points and lines used to draw graphs on a sheet of paper. Then, let us define the intersection Adh(A−H)∩ H, which is a discrete graph (vertices but no arcs) since there is no H arc in Adh(A−H). Symmetrically, let us define Adh(A'−H)∩ H. The gluing condition L of the rewriting rule is then defined by L=(H∩ Adh(A−H))∪ (H∩ Adh(A'−H)) or, equivalently, $$L = H \cap (Adh(A-H) \cup Adh(A'-H)).$$

The left side K of the rewriting rule is then defined by K=Adh(A−H)∪ L or, equivalently, $$K = Adh(A-H) \cup (H \cap Adh(A'-H)).$$

Finally, the right side M of the rewriting rule is M=Adh(A'−H)∪ L or, equivalently, $$M = Adh(A'-H) \cup (H \cap Adh(A-H)).$$

So far, the given modified graph A' (new input graph) is obtained from initial graph A (old input graph) through a DPO rule (the rewriting rule), as illustrated below.

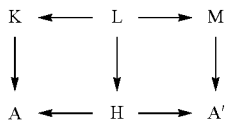

It can be proven that $A = K \cup_L H$ and $A' = M \cup_L H$.

Figure 5:
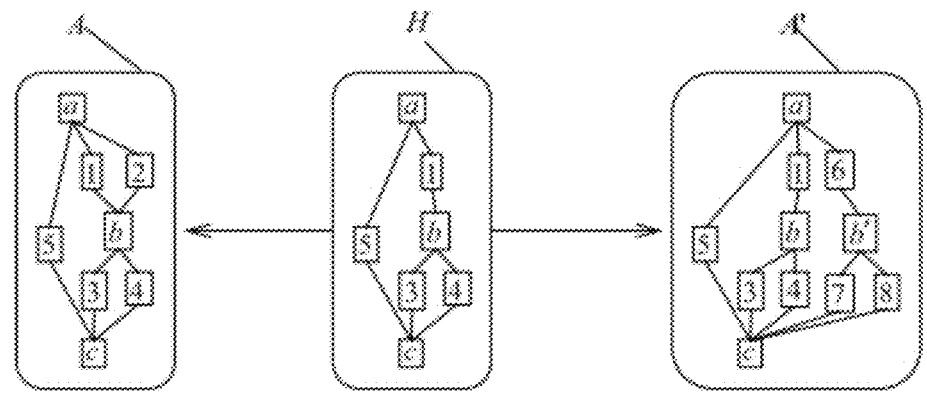
FIGS. 5-12 shows an example of the step of computing the rewriting rule.
Figure 6:
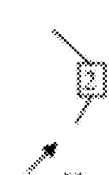
Figure 7:
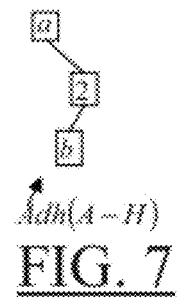
Figure 8:
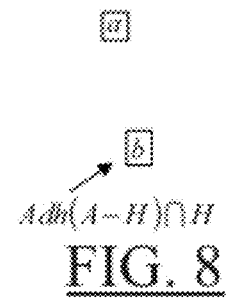
Figure 9:
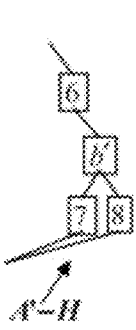
Figure 10:
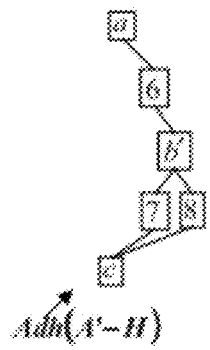
Figure 11:
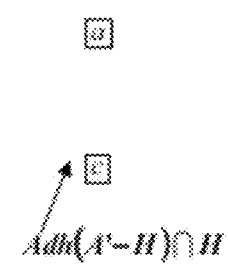
Figure 12:
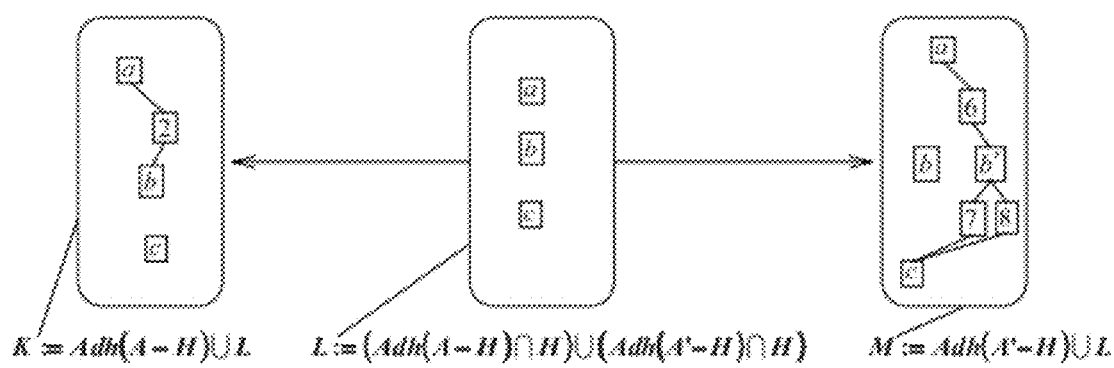

In FIGS. 5-12 now, nodes are named by lower case letters in boxes, and arcs are named by numbers in boxes. FIG. 5 shows an example of a starting span A←H→A' for the new input graph A'. Intermediate results for left side and gluing condition are provided in FIGS. 6-8. Notice that A−H is not a graph. Intermediate results for right side and gluing condition are provided in FIGS. 9-11. Notice that A'−H is not a graph. Synthesis of span K←L→M is provided in FIG. 12. This is the DPO rule that changes A into A' (i.e. the rewriting rule for the example of FIG. 5).

Figure 13:
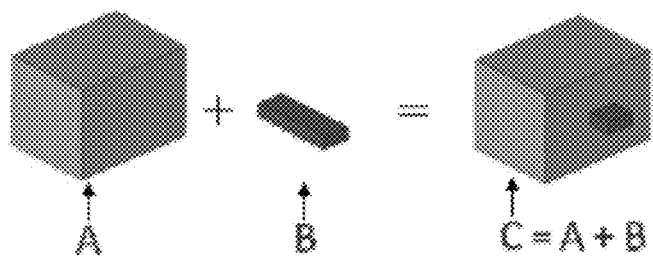
FIGS. 13-14 show an example illustrating the principle of the invention method.
Figure 14:
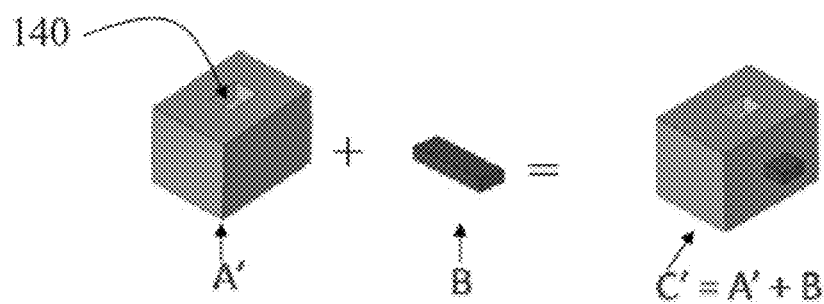

The principle of the method is now illustrated through an example with reference to FIGS. 13-14.

In this example, the old input graph may be a graph corresponding to large bloc A. In the example, the operation consists in merging A with small bloc B, as shown on FIG. 13. As a result, the old output graph is the one corresponding to solid C=A+B.

Then, solid A is changed into solid A' by adding a small pocket 140 on its top face. The new input graph is thus a graph corresponding to A'. This modification may be performed by a user who wants to reuse solid C but not exactly as such. The expected resulting solid is C'=A'+B, as illustrated on FIG. 14. The method proposes to compute the rewriting rule that specifies how A is modified into A', and to apply this rewriting rule directly on C. In fact, computing solid C' from solids A' and B would be for the system to perform exactly the same computations as those to get C=A+B because differences between the new input A' and the old input A are "far" from the interaction with B. These computations would thus be performed twice. Thus, the method allows time saving compared to rerunning the operation on A'. Indeed, running the operation implies geometrical computations such as surface and volume intersections, whereas applying the rewriting rule consists in performing logical operations only.

The following now provides examples of the graphs with reference to FIGS. 15-21. The graphs may be any graph modeling the modeled object as known from prior art. In particular, nodes of the old input graph, of the new input graph, and of the old output graph may point to geometric data. This geometric data may for example comprise data on surfaces and points. This geometric data allows the representation of the modeled object.

Figure 15:
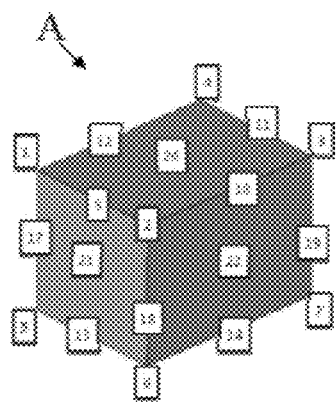
FIGS. 15-21 show examples of the graphs.
Figure 16:
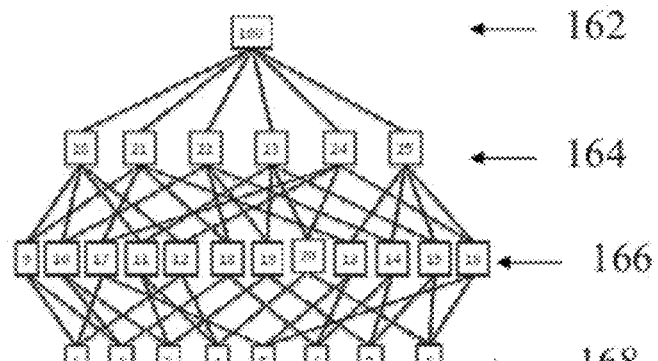
Figure 17:
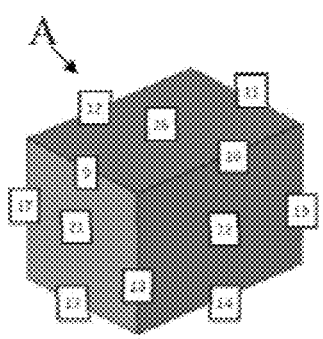
Figure 18:
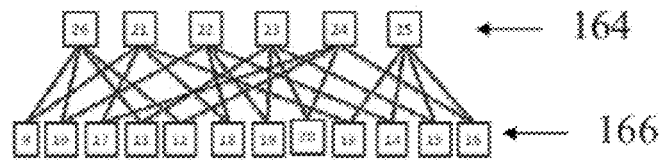
Figure 19:
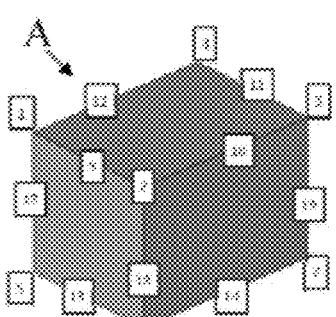
Figure 20:
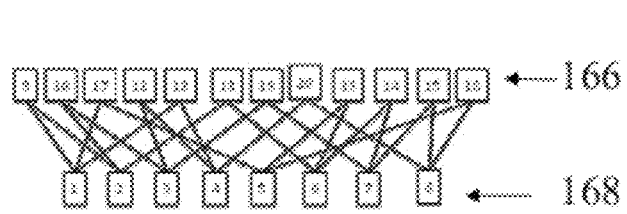

Notably, the old input graph, the new input graph, and the old output graph may be at least sub-graphs of boundary-representation graphs in case of a 3D modeled object (i.e. "cell graphs"). They may for example be the whole boundary-representation graphs. First of all, solids are handled as cell graphs. A cell graph is a classical data structure to capture B-rep. The nodes of a cell graph are cells. "Cell" is a generic word for volume, face, edge and vertex. The arcs of the cell graph capture the " . . . is bounded by . . . " relationship: the volume is bounded by faces, the face is bounded by edges and the edge is bounded by vertices. Drawing convention is a top down orientation of cell graph arcs. For example, the full cell graph (i.e. the boundary-representation graph, i.e. the cell graph comprising all cells) that captures the topology of solid A shown on FIG. 15 is illustrated on FIG. 16. Only visible cells are labeled. (The term "label" refers to the numbers in small boxes, possibly as nodes of the cell graphs, on the figures.) Volume 162 labeled "100" is bounded by faces 164 labeled "21", "22", "23", "24", "25", "26". Face labelled "22" bounds volume labeled "100" and is bounded by edges 166 labeled "10", "18", "14" and "19". Edge labeled "10" bounds faces labeled "22" and "26" and is bounded by vertices 168 labeled "2" and "3". Vertex labeled "2" bounds edges labeled "9", "10" and "18".

In such a case, the method is particularly fast if it is run on a system where intermediate boundary-representation graphs are stored. This is notably the case of many history based CAD systems. Indeed, those systems store the whole history of a 3D modeled object as a tree, wherein the leaf nodes are solids, the other nodes are operations, and for each node the corresponding boundary-representation is stored.

However, the old input graph, the new input graph, and the old output graph may alternatively be face-edge graphs or edge-vertex sub-graphs of the boundary-representation graphs. The face-edge sub-graph of a boundary representation graph is the sub-graph limited to the nodes representing faces and edges and to the arcs linking these nodes. The edge-vertex sub-graph of a boundary representation graph is the sub-graph limited to the nodes representing edges and vertices and to the arcs linking these nodes. Using such sub-graphs allows for a fast update. Because the graphs used are smaller, the computation of the rewriting rule and its applications is easier in terms of CPU.

In fact, the invention does not need to deal with all cell types of a cell graph. Firstly, the volume cell always changes because its faces change, so there is no reason to keep track of the volume cell in this sense. Then, dealing with the face-edge-vertex cell graph is not even necessary for the following reasons. If the face level is relevant, then the vertex level is not necessary because vertices always follow faces reorganization, so there is no reason to keep track of the vertex cells in this sense. If the face level is not relevant, then the edge-vertex cell graph is used. Consequently, depending on the problem complexity, either the face-edge cell graph or the edge-vertex cell graph is useful. An example will be solved later with the face-edge cell graph, illustrated on FIG. 18 for solid A shown again on FIG. 17, on which only visible faces 164 and edges 166 are labeled. Illustrated on FIG. 20, the edge-vertex cell graph of solid A shown again on FIG. 19, on which only edges 166 and vertices 168 are labeled.

It should however be noticed that the method is not restricted to solid modeling. It applies as well to wire frame and surface operations and/or non manifold topologies. These applications may require the full cell graph.

Figure 21:
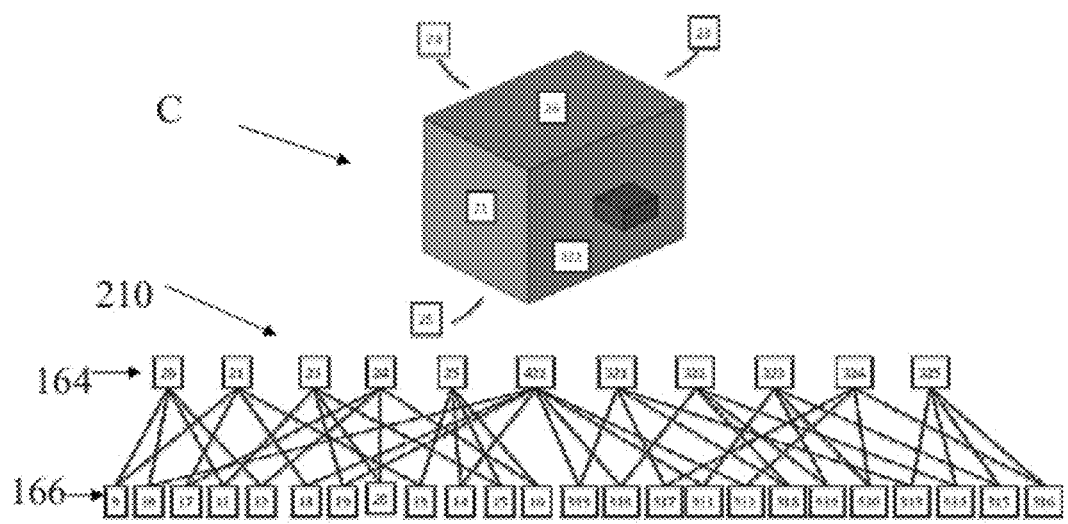

As discussed earlier, unchanged cells may be "shared". This means, in the example, that cells of solid A that are not changed by operation C=A+B are labeled with the same number in A and C cell graphs (n.b. in the following, the solids and the cell graphs are confounded for convenience). In the context of a computer-implemented method, this means that these objects have a same identifier or point to each other. If it is not the case, then morphisms may be added to the rewriting rule as discussed earlier. Cell sharing is a standard capability of state of the art commercial geometric modeling systems. In FIG. 21, solid C presented earlier in FIG. 13 and its (face-edge) cell graph 210 are shown. Clearly, faces 164 labeled "21", "23", "24", "25", "26" are shared by cell graph A and cell graph C. Cell face labelled "422" is a new cell in cell graph C. It is bounded by eight edges 166. All edges 166 of cell graph A are shared with cell graph C.

This cell sharing allows a possible first step toward DPO rewriting rule, which is to find the intersection of cell graphs A and C. Then, e.g. graph computation detailed earlier yields the DPO rewriting rule that changes cell graph A into cell graph C and vice versa.

The method may further comprise computing a second rewriting rule that specifies "another replaced" which is a part of the old input graph to be replaced, "another replacement" which is a part of the old output graph to replace the part of the old input graph, another interface which is a part common to the "other replaced" and the "other replacement." In other words, a second rewriting rule, following the same format as the rewriting rule and specifying the transformation of the old input graph into the old output graph is computed. This second rewriting rule may be computed as the former one, e.g. as a DPO.

In this example, there are thus two rewriting rules: the rewriting rule and the "other" rewriting rule. For convenience, the rewriting rule will be referred to as the "Old-input-to-new-input DPO rewriting rule". The other rewriting rule will be referred to as the "Old-input-to-old-output DPO rewriting rule". The DPO computation of the "Old-input-to-new-input DPO rewriting rule" yields the DPO rewriting rule that changes cell graph A into cell graph A' and vice versa. "Old-input-to-old-output DPO rewriting rule" yields the DPO rewriting rule that changes cell graph A into cell graph C and vice versa.

Figure 22:
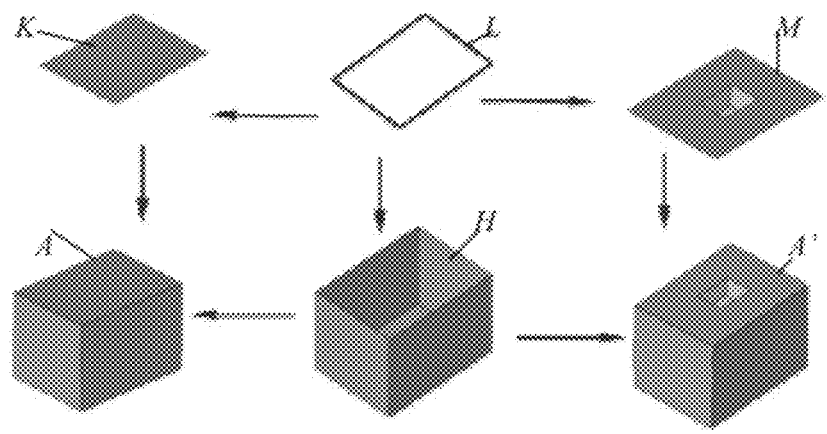
FIGS. 22-24 illustrate the rewriting rules corresponding to the example of FIGS. 13-14, FIGS. 25-27 illustrate the commutativity test.
Figure 23:
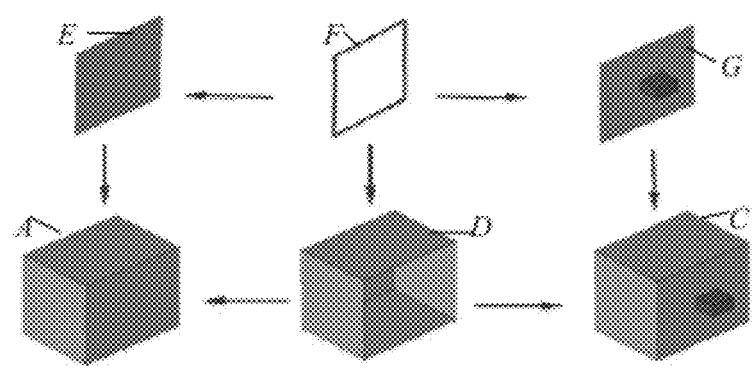

FIGS. 22-23 respectively illustrate the "Old-input-to-new-input DPO rewriting rule" and the "Old-input-to-old-output DPO rewriting rule" corresponding to the example of FIGS. 13-14 through a geometrical representation of face-edge cell graphs.

Figure 24:
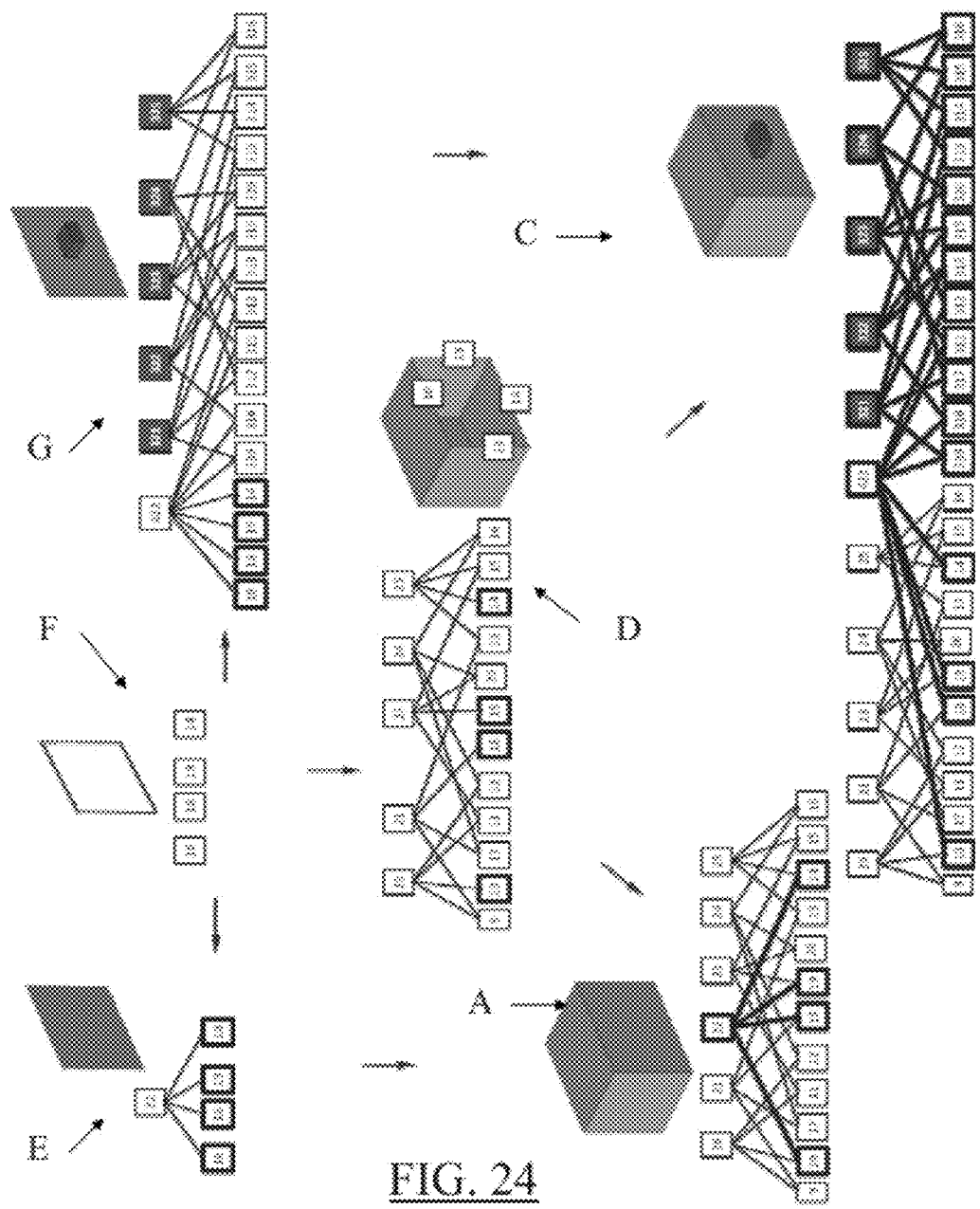

Span A←D→C means that cell graph D is the intersection of cell graphs A and C, which is captured through injective graph morphisms represented by arrows ← and →. Span E←F→G is the rewriting rule including E as the sub cell graph to be replaced, F as the interface and G as the replacement sub graph. It is computed from span A←D→C e.g. according to the algorithm described earlier. The "Old-input-to-old-output DPO rewriting rule" is more completely illustrated on FIG. 24, which represents a graph representation of the face-edge cell graphs as well.

The method may further comprise testing that the rewriting rule and the other rewriting rule are commutative before applying the rewriting rule to the old output graph. In other words, before applying the rewriting rule, there is a test of commutativity. In an example, the result of the test is positive. The idea is to avoid applying the "old-input-to-new-input" rewriting rule when there is high chance that the modification leading to the new input graph is in conflict with the operation. This saves time because in such a case, the operation may need to be rerun on the new input graph anyway. For example, if the operation and the modification act on the input graph topologically at the same spot, there may be a conflict which is avoided by the commutativity test.

The testing may be performed by comparing an intersection between the replaced and the other replaced to an intersection between the interface and the other interface. The rewriting rule and the other rewriting rule are then commutative (i.e. the test is positive) when the two intersections are equal.

Old input A is concurrently written into old output C and into new input A', as illustrated by the DPO rewriting rules diagram below.

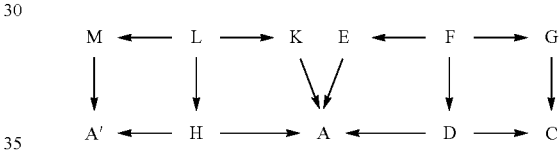

Figure 25:
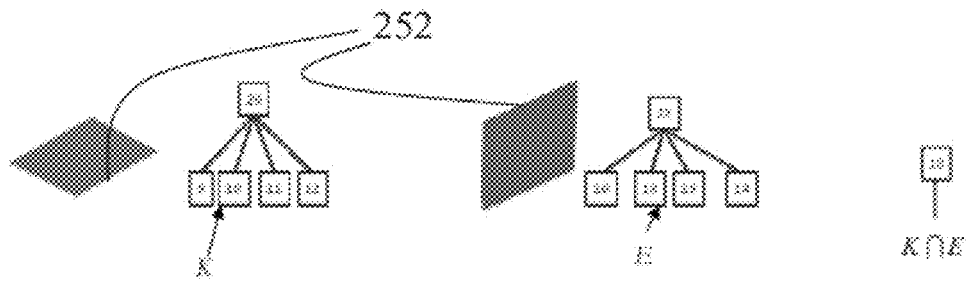

The idea is to check whether DPO rewriting rules K←L→M and E←F→G are independent. This is performed by comparing the intersection of left sides K and E to the intersection of interfaces L and F. If these intersections coincide, then the DPO rewriting rules can be applied sequentially in any order and yield the same result. Cell graphs K and E shown at 252 on FIG. 25 are respectively the top face and front face of solid A (faces labeled respectively "26" and "22" on FIG. 15) and their cell graph intersection results in cell labeled "10".

Figure 26:
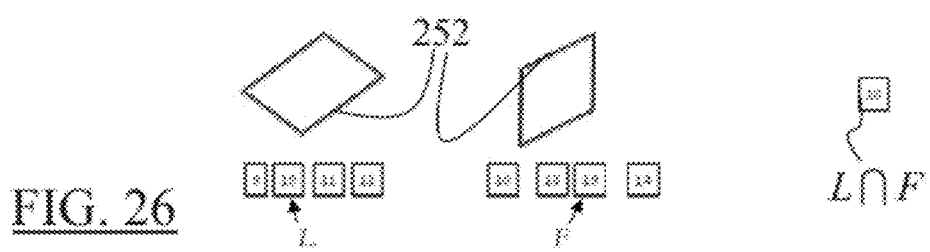

Cell graphs L and F shown on FIG. 26 are respectively boundary edges of faces labeled "26" and "22". Their cell graph intersection results in cell 10 as well, which makes the DPO rewriting rule independent in this example.

Indeed, in an example, the evaluation of commutativity may comprise comparing a part intersection (L∩L') between the first part (L) and the second part (L') to an interface intersection (G∩G') between the first interface (G) and the second interface (G'). The evaluation is then negative when the part intersection (L∩L') is not equal to the interface intersection (G∩G').

The problem of commutativity may be to answer the following questions. Can the two DPO rules K←L→M and E←F→G be applied sequentially? If yes, does the result depend on the sequence order? If no, why cannot they be applied sequentially? The commutativity criterion provides all the answers.

The structure of a DPO rule is now shortly explained again. Left side K or E is the pattern identified in the initial graph. Right side M or G is the new material that replaces left side pattern. This substitution is carefully controlled by the gluing condition (the interface) L or F. The role of this interface is to guarantee that replacing K by E or M by G preserves the graph structure. All arcs and nodes of K excluding those of L are replaced by arcs and nodes of M. Consequently, the DPO rules are commutative if they do not share any overwritten elements, in other words if the patterns intersection is included in the interfaces intersection, i.e. formally: $K \cap E \subset L \cap F$. Since the reverse inclusion $K \cap E \supset L \cap F$ is always true, it is equivalent to formulate the commutativity criterion as $K \cap E = L \cap F$. Of course, in practice, only $K \cap E \subset L \cap F$ needs to be evaluated for faster evaluation.

Now the answers to the above questions: if the DPO rules $K \leftarrow L \rightarrow M$ and $E \leftarrow F \rightarrow G$ are commutative, that is if $K \cap E = L \cap$, then they can be applied sequentially in any order and the result does not depend on the sequence order. If the DPO rules are not commutative, that is $K \cap E \neq L \cap$, they cannot be applied sequentially. At least one element of one left side is missing after the first rule is applied. The intersection $K \cap E$ provides elements (arcs and nodes) that are written differently by the DPO rules. These are referred to as "conflict" elements. Notice that if $K \cap E \neq L \cap$ then $K \cap E$ is not empty, otherwise $L \cap F$ would be empty as well since $K \cap E \supset L \cap$ and there would be a contradiction.

The commutativity test may also be useful in the following situation.

In an example, the old input graph, the new input graph, and the old output graph are edge-vertex cell graphs. The method further comprises, prior to the providing (S2) of the old input graph, the new input graph, and the old output graph, providing an old face-edge input graph of the operation, an old face-edge output graph, a new face-edge input graph of the operation. The method also comprises computing a face-edge rewriting rule that specifies a face-edge replaced which is a part of the old face-edge input graph to be replaced, a face-edge replacement which is a part of the new face-edge input graph to replace the face-edge replaced, a face-edge interface which is a part common to the face-edge replaced, the second face-edge replacement and the old face-edge output graph. The method also comprise computing another face-edge rewriting rule that specifies another face-edge replaced which is a part of the old face-edge input graph to be replaced, another face-edge replacement which is a part of the old face-edge output graph to replace the other face-edge replaced, another face-edge interface which is a part common to the other face-edge replaced and the other face-edge replacement. The method then comprises testing that the face-edge rewriting rule and the other face-edge rewriting rule are not commutative (the test is performed and the result may be negative).

The principle of this example is the following. The idea is to compute the rewriting rule that changes the old input into the new input and to apply this rewriting rule to the old output if the rewriting rule is commutative with the other rewriting rule which changes the old input into the old output. The graph foreseen at first is the face-edge graph. If the two rewriting rules are not commutative, it means that the modification and the operation act at the same topological localization on the face-edge level. At this point, it is preferable not to apply the rewriting rule on the old output because there is no guarantee that there is no conflict. However, it is possible at this point to rerun the process but at the edge-vertex level. Indeed, the modification and the operation may be not commutative at the face-edge level, but commutative at the edge-vertex level. In such a case, it is judicious to consider applying the rewriting rule computed with the edge-vertex graph on the old output graph instead of rerunning the operation systematically. In other words, the edge-vertex graphs allow a refined evaluation of the commutativity. The edge-vertex graphs are heavier than the face-edge graphs. Thus, working on the face-edge graphs at first and switching to the more refined edge-vertex level when necessary allows speeding up the method e.g. in case many operations are contemplated.

In the case the modeled object is a 3D modeled object and nodes of the old input graph, of the new input graph, and of the old output graph point to geometric data, the method may further comprise testing for 3D compatibility between a volume corresponding to the replacement and a volume corresponding to the other replacement. In other words, before applying the rewriting rule, there is a test of 3D compatiblity, and the result of the test is positive. The idea is still to avoid applying the "old-input-to-new-input" rewriting rule when there is high chance that the modification leading to the new input graph is in conflict with the operation. This saves time because in such a case, the operation may need to be rerun on the new input graph anyway. For example, if the operation and the modification act on the input graph geometrically at the same spot, there may be a conflict which is avoided by the 3D compatibility test. Of course, this compatibility test may be applied or not in combination with the commutativity test(s), for an even more secure application of the rewriting rule should it be the case.

Referring back to the example of FIGS. 13-14, the goal is to switch the DPO rewriting rules by applying $K \leftarrow L \rightarrow M$ on cell graph C, which should yield the cell graph C' without any geometrical and topological computation. The very last step before doing this is to check that there is no spatial interaction between the B-rep of M and the unchanged input B. This check insures that independency suggested by DPO rewriting rules analysis is actually true in 3D space.

The 3D compatibility test may be performed according to any classical process known per se. For example, the 3D compatibility test may involve computing surrounding boxes which grossly surround the modification performed e.g. by the user and the modification involved by the operation. Then, intersection of these surrounding boxes may be tested, the result being negative (i.e. incompatibility) when the boxes intersect. The following does not provide more details as the techniques for testing 3D compatibility are well known in the field of CAD.

The commutativity test is a logical operation as opposed to the additional 3D compatibility checking, which is a geometrical test. In the general context of 3D modeling, it is a good practice to run logical and fast testing prior to geometrical and more expensive testing. Furthermore, in the context of the method, performing rewriting rule testing allows a fast switch from the Face-Edge cell graph analysis to the Edge-Vertex cell graph analysis as illustrated on FIG. 27, which presents a flowchart of an example of the method with a combination of the different.

Figure 27:
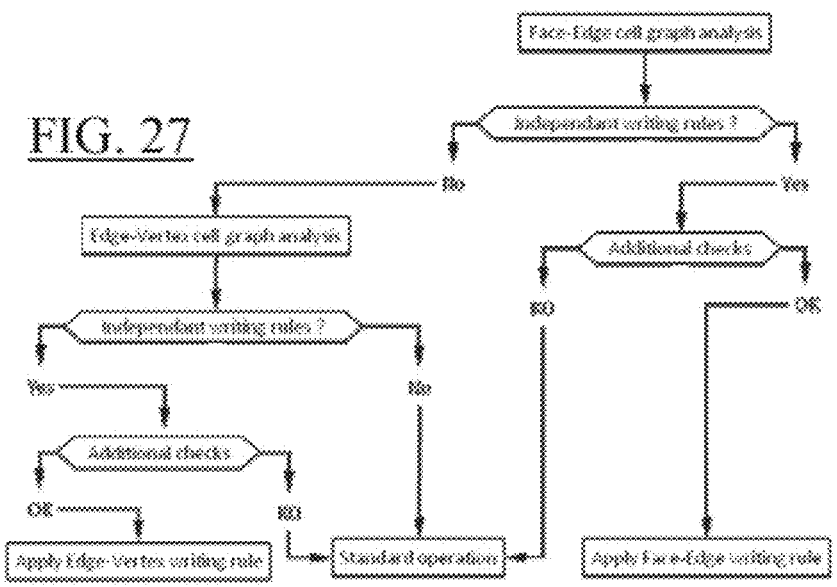

If, in addition, the rewriting rule testing performed on the Edge-Vertex cell graph yields a negative answer, the decision path toward the standard operation is run without any geometrical testing, as illustrated on FIG. 27. This way, less computer time is spent during the analysis for fast update when the method cannot be used. One more advantage of rewriting rules independency testing is that the intersection of interfaces provides a valuable hint for 3D checking. In other words, and from the implementation point of view, the rewriting rules independency testing should be understood as the initial step of 3D checking So far, the method takes into account one previous result together with one modified operand (i.e. input graph). However, the method is easily generalized to the case of two modified operands. Referring again to the example of FIGS.

13-14, let A, B be the previous solid operands and C the previous solid result, C=A−B for example. Let A', B' be the new solid operands. The point is to consider the couple of solids (A, B) as a single operand and the couple of solids (A', B') as the new operand. From the cell graph point of view, considering a couple (A, B) is to consider a cell graph made of two separated cell graphs, the cell graph of solid A and the cell graph of solid B. Then, the question is to find the old-input-to-old-output DPO rewriting rule that changes cell graph (A, B) into cell graph C, possibly to find the old-input-to-new-input DPO rewriting rule changing cell graph (A, B) into cell graph (A', B') and possibly to check if they are independent or not. These may be performed exactly the same way as for one input graph.

So far, the method has been described with one operation. However, the providing (S1) an operation, providing (S2) the old input graph, the old output graph and the new input graph, and computing (S3) the rewriting rule may be iterated over historical operations of the modeled object, the operation of each iteration being a respective historical operation. Indeed, in a history based CAD system, a 3D modeled object is generally modeled by historical operations arranged in a history. In such a case, the method may be iterated over the history. For each iteration, the new input is the new output of the preceding iteration, if this new output is a modification of the old output of the preceding operation of course. Such a method allows a fast update of a 3D modeled object defined in a history based CAD system, since some of the historical operations are not rerun.

Different examples of performing the method are now discussed with reference to FIGS. 28-72.

Figure 28:
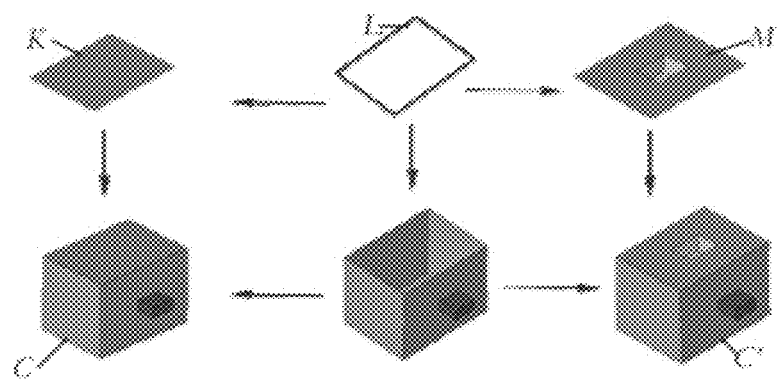

First of all, the example of FIGS. 13-14 is discussed once more with reference to FIG. 28.

The spatial check (i.e. the 3D comptability test) is positive. Therefore, the method comprises applying DPO rewriting rule K←L→M (the old-input-to-new-input change) on cell graph C (the old output) to yield the cell graph C' (the new output) as illustrated on FIG. 28. Once more, notice that only logical tests and simple 3D spatial tests are performed to get the diagnosis, and that applying the DPO rewriting rule is a matter of routing pointer in a logical structure. Consequently, the computing time is expected to be very small compared to the full geometrical and topological operation.

The example of FIGS. 29-32 is to illustrate a negative independency (i.e. commutativity) test.

Figure 29:
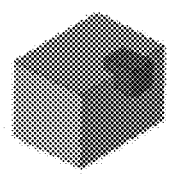
Figure 30:
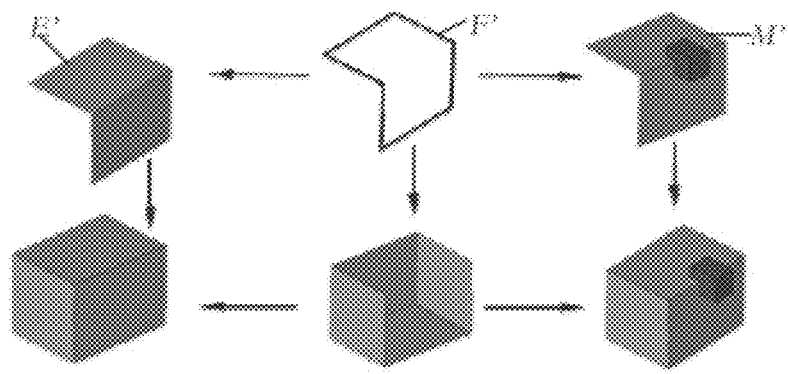
Figure 31:
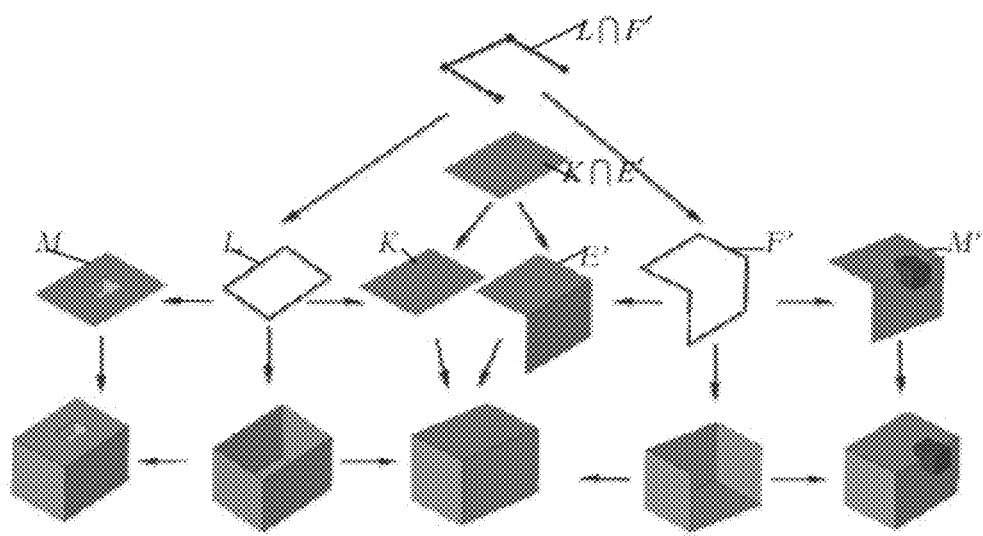
Figure 32:
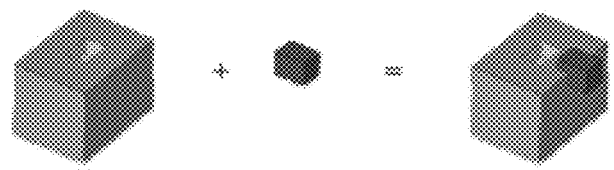

Now, the small bloc B not only trims the front face but also trims the top face of solid A, as illustrated on FIG. 29. The new input solid is the same as the previous example: solid A' is solid A featuring a small pocket on its top face. Then, the old-input-to-old-output DPO rewriting rule E'←F'→M' is as represented on FIG. 30. The old-input-to-new-input DPO rewriting rule K←L→M is the same as in the previous example. Brought together in the same drawing, it is clear that these two DPO rewriting rules are not independent (i.e. commutative). Their left sides intersection E'∩K is the top face cell of cell graph A while the intersection of their interfaces F'∩L includes three edge cells, as illustrated on FIG. 31. In other words, the commutativity test says that the top face cell of solid A is overwritten differently by the two DPO rewriting rules, which results in a conflict. Consequently, the DPO rewriting rules, as performed on face-edge cell graphs, do not switch. This suggests that the full operation must be replayed to provide the new result from new inputs.

Figure 33:
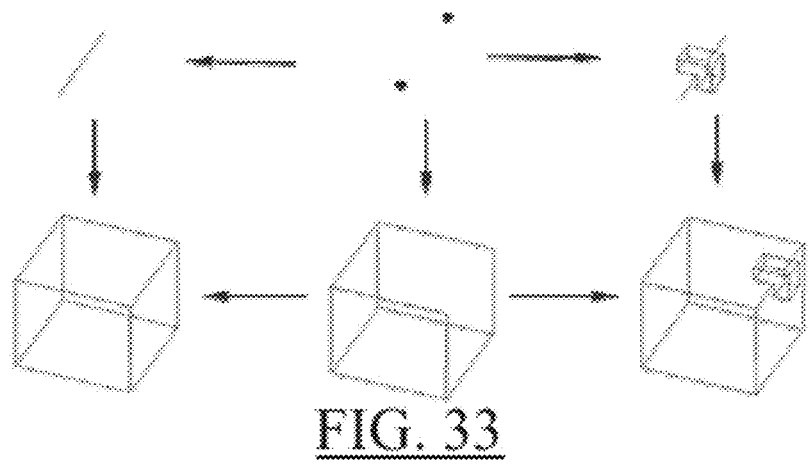
Figure 34:
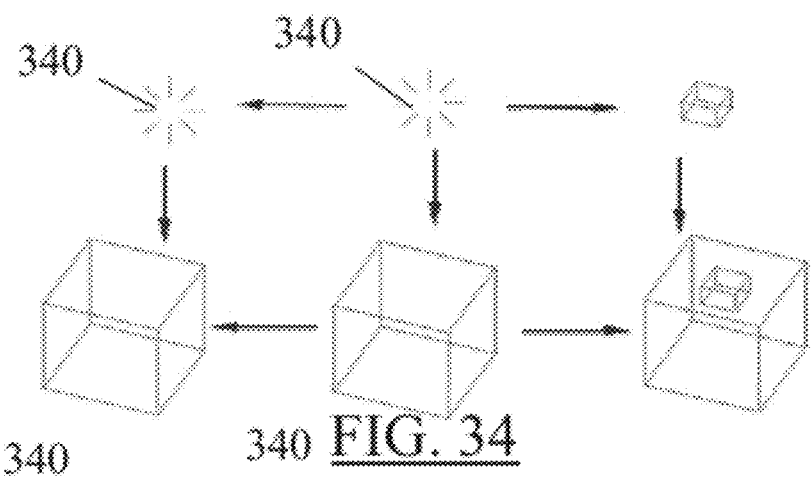
Figure 35:
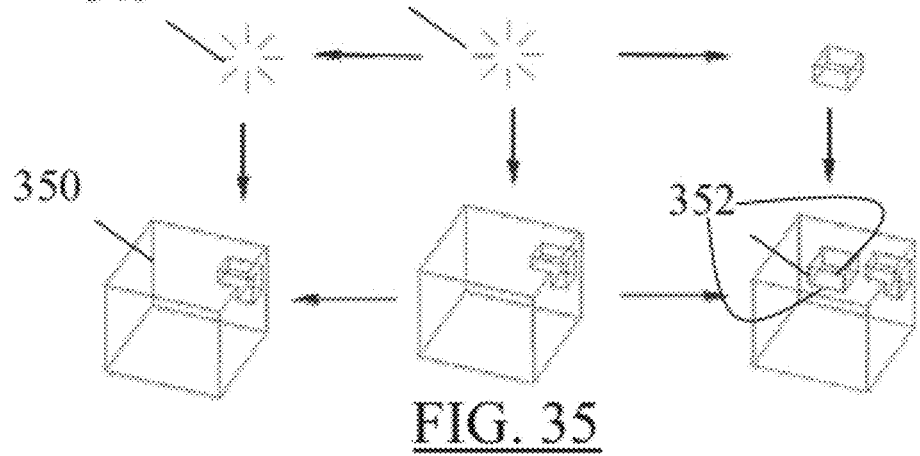
Figure 40:
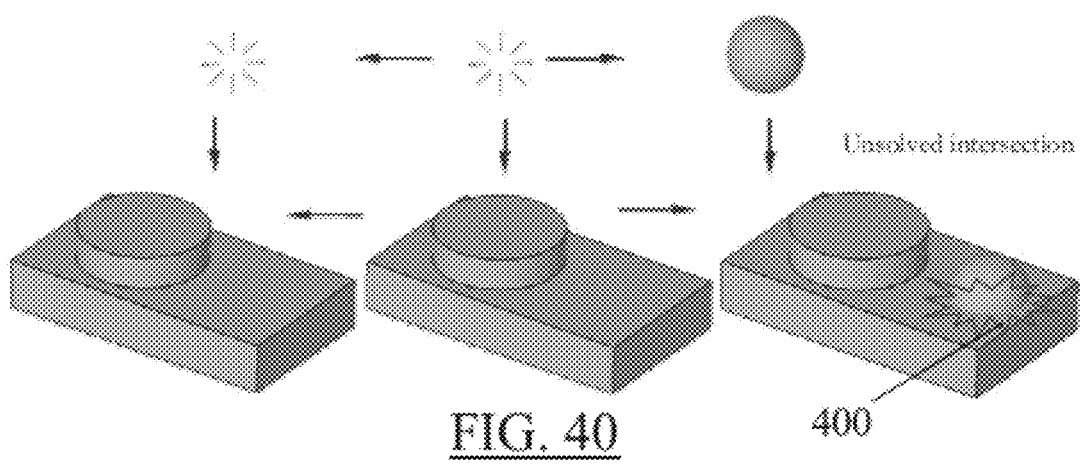
Figure 41:
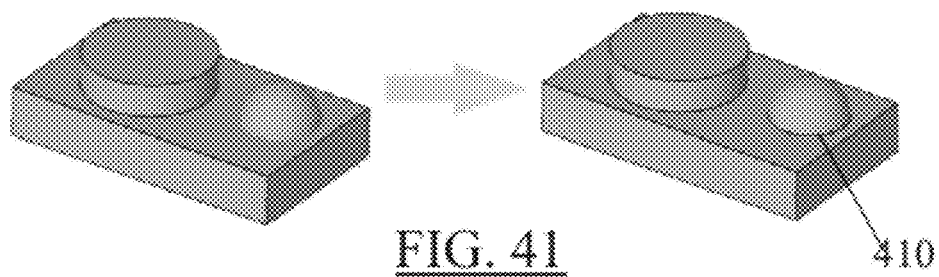
Figures 42, 43, 44:
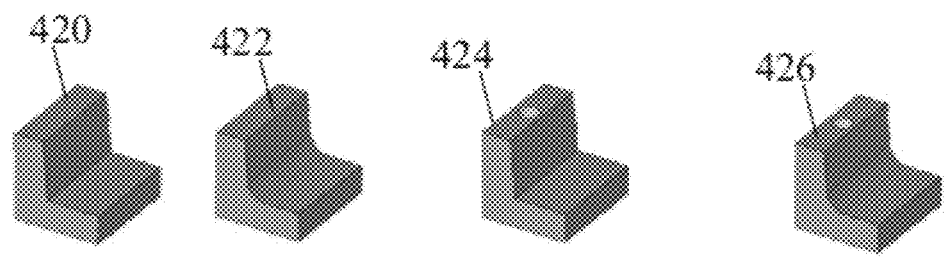

Nevertheless, the same process can be applied to the edge-vertex cell graph instead of the face-edge cell graph, as explained with reference to FIGS. 33-35.

From the geometrical point of view, the edge-vertex graph only captures the wireframe topology of solids. The old-input-to-old-output DPO rewriting rule is illustrated on FIG. 33. Notice that the rewriting rule is represented through a wireframe geometrical representation of the solids to represent the fact that the rewriting rule applies on an edge-vertex graph. Similarly, the old-input-to-new-input DPO rewriting rule is illustrated on FIG. 34. It is very simple because it is the addition of two disjoint graphs. Consequently, left side and interface are empty graphs 340.

These two DPO rewriting rules are independent because the intersection of their left sides is equal to the intersection of their interfaces, which are both the empty graph. Consequently, the old-input-to-new-input DPO rewriting rule is applied to the old output 350, as illustrated on FIG. 35.

The additional 3D checking is to compare faces of the small pocket to faces of the old output solid. This results in additional edges 352 on the top face of the old output solid.

FIGS. 36-37 exemplify the case when the rewriting rules are independent while additional 3D spatial test concludes that there is no 3D independency.

Here, solid A' features a pocket 360 that is deep enough to run into solid B, as illustrated on FIG. 36. Clearly, additional geometrical and topological operations are needed to compute the interaction between solids A' and B to get the small portion of solid B remaining inside the pocket. In other words, in order to obtain the new output C' shown on FIG. 37, the operation needs to be run again because the 3D compatibility test is negative. However, using the edge-vertex cell graph instead of the face-edge cell graph saves intersection curves between solids A and B which were already computed.

With reference to FIGS. 38-41, the case when the DPO rewriting rules are independent while the additional check says that it cannot be directly applied is exemplified.

Even though there is no direct application of the rewriting rule to the old output, the old output is still reused to compute the new output, which saves computation. The old input is a cylinder 380 that is added to a rectangular bloc 382, yielding the old output 384. The new input 386 is the same cylinder 380 together with a sphere 388. The sphere does not intersect the cylinder, which defines a solid including two lumps. The old-input-to-old-output DPO rewriting rule is illustrated on FIG. 38. The interface is the top circle of the cylinder, the invariant is the top face of the cylinder. Now, the old-input-to-new-input DPO rewriting rule, shown on FIG. 39, is very simple since left part and interface are empty graphs. This is because nothing in the initial object is replaced in the final object, the sphere is simply added beside the cylinder.

According to the commutativity test, these DPO rewriting rules are independent because the intersection of their left part and the intersection of their interfaces are equal. Actually, they are both equal to the empty graph. Additional 3D check shows interference 400 between the new portion of the new input (the sphere) and the old input (the rectangular bloc). Consequently, the object resulting from applying the old-input-to-new-input DPO rewriting rule to the old output is not a valid solid, as illustrated on FIG. 40.

Nevertheless, in this case, this object is a valuable starting point to compute the genuine new output by saving geometrical computation. Indeed, the intersection between the cylinder and the bloc are reused from the old output, the only and unavoidable geometrical computation is the intersection 410 of the old output with the sphere, as illustrated on FIG. 41. The full operation would recompute both the bloc/cylinder intersection and the bloc/sphere intersection.

Thus, in this example, after the negative compatibility test, geometrical computations are performed according to the compatibility test (here, the intersection 410 is computed) on the old output which is thus slightly modified, and then only the method applies the rewriting rule to the old output. Because geometrical computations according to the compatibility test are performed, the method still saves time as compared to rerunning the operation on the new input.

A first example of the method with rounding or filleting operations is discussed with reference to FIGS. 42-53.

The filleting example is to illustrate the capability of the invention to deal with non Boolean operations. The old input 420 is the L-shape solid illustrated on FIG. 42. The old output 422 is the filleted L-shape solid illustrated on FIG. 42 as well. The new input 424 is the L-shape solid featuring a hole on its top face illustrated on FIG. 43. A traditional update would rerun the filleting operation on the new input 424 solid to provide the new output solid 426 illustrated on FIG. 44. The point here is to avoid the filleting replay during the update.

Figure 45:
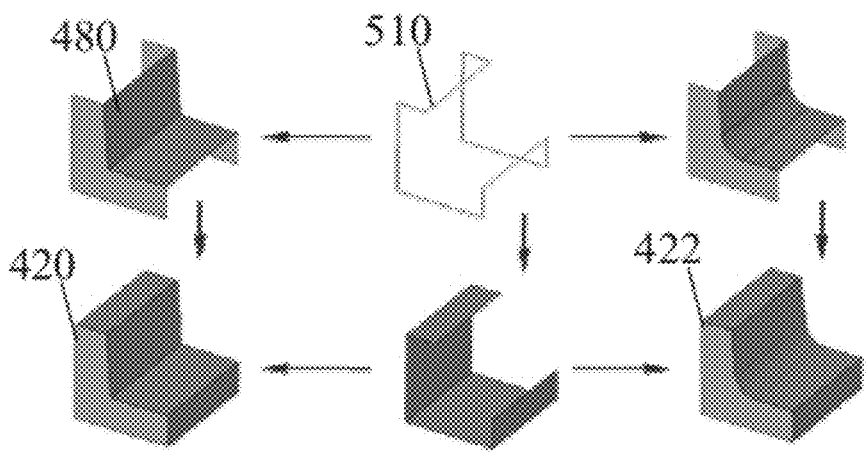
Figure 46:
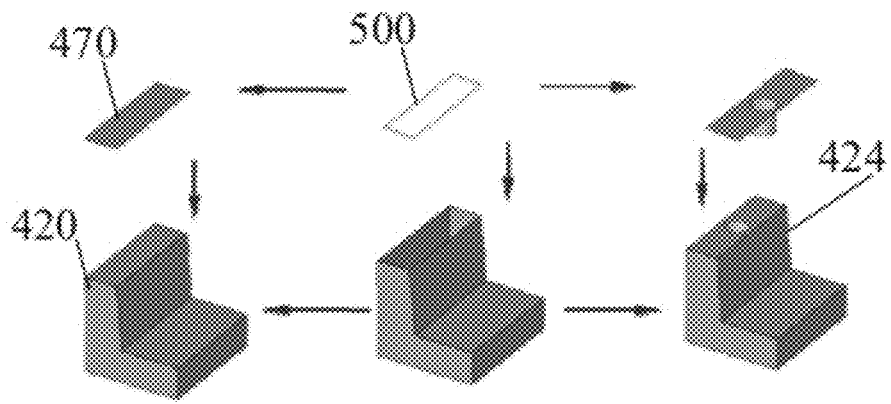
Figure 47:
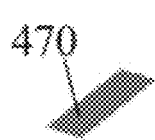
Figure 48:
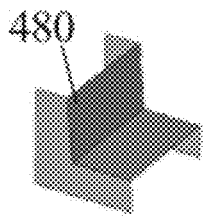
Figure 49:
Figure 67:
Figure 68:
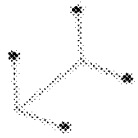
Figure 69:
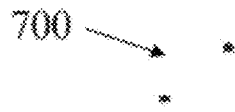
Figure 70:
Figure 71:
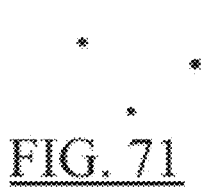
Figure 72:

The old-input-to-old-output DPO rewriting rule is illustrated on FIG. 45. The old-input-to-new-input DPO rewriting rule is illustrated on FIG. 46. These two DPO rewriting rules are commutative. Indeed, on one hand, the intersection of the left side 470 of the old-input-to-new-input DPO rewriting rule and the left side 480 of the old-input-to-old-output DPO illustrated on FIGS. 47-48, is the U-shape wire 490 illustrated on FIG. 49. On the other hand, the intersection of the interface 500 of the old-input-to-new-input DPO rewriting rule and the interface 510 of the old-input-to-old-output DPO illustrated on FIGS. 50-51 is the same U-shape wire 490 illustrated on FIG. 52.

Additional 3D checking validates that the graph rewriting operation provides the correct result. Applying the old-input-to-new-input DPO rewriting rule to the old output provides the expected result, without recomputing the filleting operation, as illustrated on FIG. 53.

A second example of the method with rounding or filleting operations is discussed with reference to FIGS. 54-72.

In this second example, the old input change is a bit different. The hole trims the front (drafted) face 582 of the L-solid 560. This leads to non independent DPO rewriting rules; however the edge-vertex graph allows some rewriting work. Illustrated on FIGS. 54-57, the new position of the hole added on the L-solid and its consequences. Notice that old input 420 and old output 422 solids are the same as before.

The old-input-to-old-output DPO rewriting rule is the same as before. The old-input-to-new-input DPO rewriting rule is illustrated on FIG. 58. Notice that not only the top face is changed, but also the drafted face 582. Now the independency criterion is investigated. The intersection of the left sides 480, 590 is illustrated on FIGS. 59-61. Then, the intersection of the interfaces 510, 620 is shown on FIGS. 62-64. The results of these intersections (on FIG. 61 and FIG. 64) are not equal, so, according to the "graph merger" invention, the DPO rewriting rules are not independent. In fact, the investigation states that the drafted face of the old input solid is written differently by the two DPO rewriting rules.

FIGS. 65-72 show how to deal with rounding and filleting example 2 through edge-vertex cell graphs.

Dealing with edge-vertex graphs leads to a more favorable conclusion: DPO rewriting rules are independent when considered at edge-vertex topological level. Following the usual process, illustrated on FIG. 65 is the old-input-to-old-output DPO rewriting rule. Now, the old-input-to-new-input DPO rewriting rule is illustrated on FIG. 66. Its interface 660 includes four isolated vertices.

The intersection of the left sides is equal to the intersection of the interfaces. They are both equal to a couple 700 of vertices located on the top face of the L-solid, as illustrated in FIGS. 67-72. Consequently, the DPO rewriting rules are independent, and the old-input-to-new-input DPO rewriting rule can be applied to the wireframe topology of the old output, yielding the wireframe topology of the new output. Additional 3D checking (mainly testing that non adjacent faces are separated) allow to compute the new output solid without rerunning the filleting operation, which was the goal.

The following summarizes different features and advantages of non-limiting examples of the method.

As has been discussed, in examples, the method deals with creating, editing, modifying and updating the shape of a virtual part using a computer aided geometric design system (CAD system in the following). The resulting shape of the solid part is saved as well through a topological and geometrical boundary representation (B-rep in the following). Modifying a part is for the designer to change a parameter in the history of features and for the system to update the B-rep of the part by replaying the appropriate subset of features captured in the history.

The method may speed up each operation stored in the history during the history replay. This is achieved by using the knowledge of old input(s), old output and new input(s). The process may be to consider the old input as an initial model that is concurrently modified to yield, on one hand, the old output, and, on the other hand, the new input. Then, old-input-to-new-input and old-input-to-old-output changes may be interpreted as rewriting rules on graphs. Mainly, an independency criterion may be used to check if the two changes can switch. If so, the old-input-to-new-input change is applied to the old output, which yields the new output. Of course, this process is expected to be much faster than computing the new output from new input(s) by running the full operation because it runs light graph manipulations instead of complex numerical, geometrical and topological computations.

The invention may take place during the history replay, so it is compatible with all history based CAD systems, thus saving the design intent. The performance drawback is eliminated by replacing, each time it is possible, a full geometrical and topological operation by a light graph re-writing operation, thus accelerating the update. This overcomes drawbacks of prior art where the price to pay for saving the design intent is a longer update time. It should be mentioned that advanced declarative systems suggested in patent EP1501026 entitled "CAD system using a context free grammar" are based on a predefined history, together with commutative properties that make the system declarative. Despite the history is hidden to the designer, the update process is exactly the same as traditional history based systems, and then can take advantage of the method.

No operation is incompatible with the method for the following reason. An operation that cannot take benefit of the method will be replayed through the traditional process: new output created from scratch with new inputs. From the implementation point of view, the method may be understood as a way to overload an existing program. The method's implementation does not require any change in existing software architecture.

Figures 1, 2, 3:
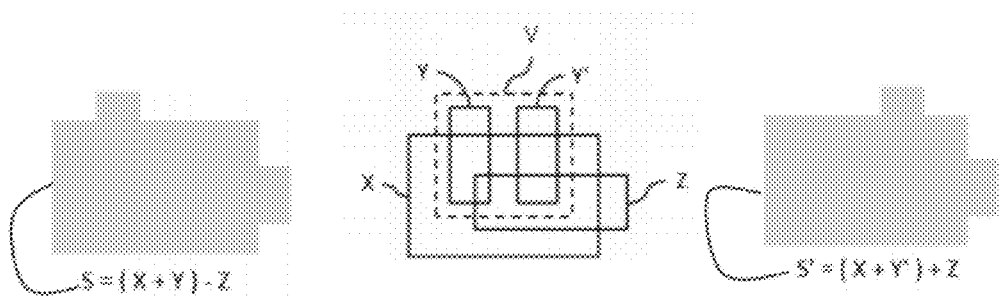
FIGS. 1-3 show an example of the prior art.

As can be understood from the above explanations, referring back to FIGS. 1-3, the method does not re-compute operation +Z. Conversely, the invention is able to reconnect the right-hand side faces of previous solid S to the modified portion of the new operand resulting from X+Y', thus avoiding +Z operation. The method is thus fast indeed. Furthermore, the method saves design intent through the history. The method is designed to have a light preprocessing and does not change the computations because it reuses previous results.

Finally, it must be mentioned that the method saves integrity. Previous results may be extensively reused, thus computing only new results. Consequently, the resulting solid is exactly the same as the solid obtained by classical history replay.

Figure 73:
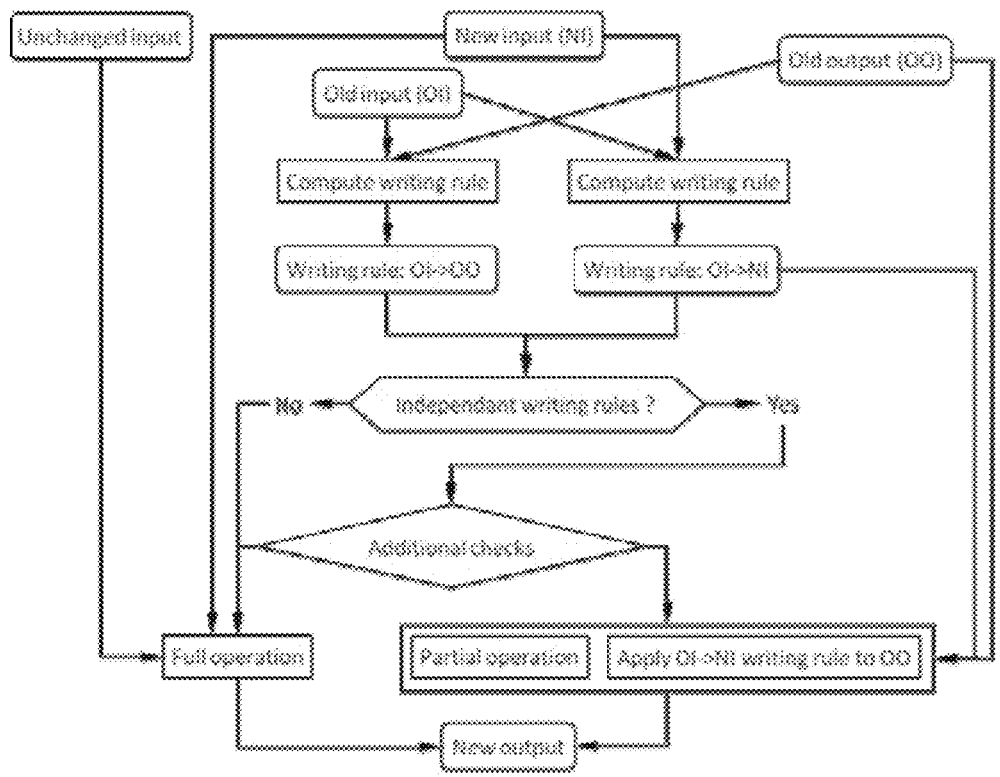

The method speeds up each operation stored in the history during the update process. This is achieved in an example by exploiting the following data: old input(s) of the operation, old output of the operation and new input(s) of the operation. A new input being a modified version of an old input. Let us focus on one modified input. The process is to consider the old input as an initial model that is concurrently modified to yield, on one hand, the old output, and, on the other hand, the new input. Then, considering B-rep of solids as cell graphs and using graph grammars and double push out rewriting rules (DPO rewriting rules in the following), old-input-to-new-input and old-input-to-old-output changes are interpreted as DPO rewriting rules performed on cell graphs. The independency criteria (commutativity test) is used to check if the two DPO rewriting rules can switch. If they can switch, from the cell graph point of view, then some complementary checks are performed, depending on the nature of the operation. Typically, a Boolean operation requires some spatial checking. If this additional checking is successful, then the old-input-to-new-input DPO rewriting rule is applied to the old output, which yields the new output. If the additional checking is not successful, a partial operation is performed. If the DPO rewriting rules do not switch because they are not independent then the full operation is performed, as it would be without the method. This is summarized in the flowchart of FIG. 73.

The above method is computer-implemented, which means that the steps of the method are executed by a computer. However, the triggering of at least some of the steps of the method may be performed through user-computer interaction. The level of user-computer interaction required may depend on the level of automatism foreseen and put in balance with the need to implement the user's desideratum. In embodiments, this level may be user-defined and/or pre-defined.

Thus, the invention is also directed to a CAD system suitable for performing the method. In practice, a user is provided with a graphical user interface (or GUI) such as the one of CATIA, the GUI being in relation with a means, e.g. a database, for storing data necessary to the execution of the method. Such a program and system allow for a fast update of any operation when the input have been modified and thus are an enhancement to collaborative design/reuse design/ulterior modifications design.

Figure 74:
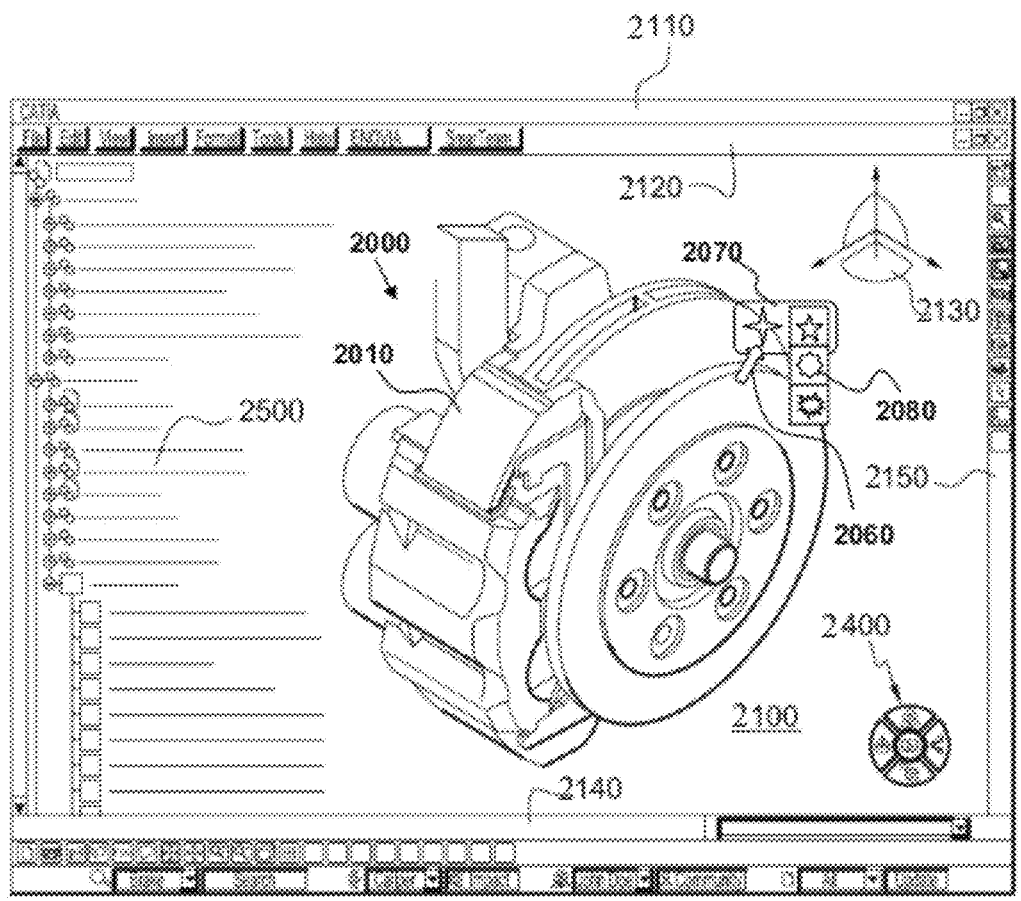
FIG. 74 shows an exemplified graphical user interface.

In reference to FIG. 74, the exemplified graphical user interface (or GUI) 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art.

Some of these icons are associated with software tools, adapted for editing and/or working on the 3D object which is a modeled product 2000 or parts of product 2000 such as that displayed in the GUI 2100. In the following description, "product", "part", "assembly" and the like may be referred to as "part" for the sake of simplicity. Note that the concept The concept of "part" can in fact be generalized to that of "object", wherein an object can be only a "physical" part of the designed product or, more generally, any software tool participating in the design process (but not necessarily "in" the final product).

The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of a 3D modeled object displayed on the screen.

The GUI may for example display data 2500 related to the displayed product 2000. In the example of FIG. 74, the data 2500, displayed as a "feature tree", and their 3D representation 2000 pertain to a brake assembly including brake caliper and disc 2010. The GUI may further show various types of graphic tools 2130, 2070, 2080, 2400 for example for facilitating 3D orientation of the object, for triggering a simulation of an operation of an edited product or render various attributes of the displayed product 2000. A cursor 2060 may be controlled by a haptic device to allow the user to interact with the graphic tools.

It is to be understood that the part 2000 can be any object in any configuration capable of being defined by a CAD/CAM/CAE system, or any system used to display views of an object from varying viewpoints. The invention may thus be implemented on a computer program comprising instructions by a computer, the instructions comprising means for causing the above system to perform the above method. The invention may for example be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Figure 75:
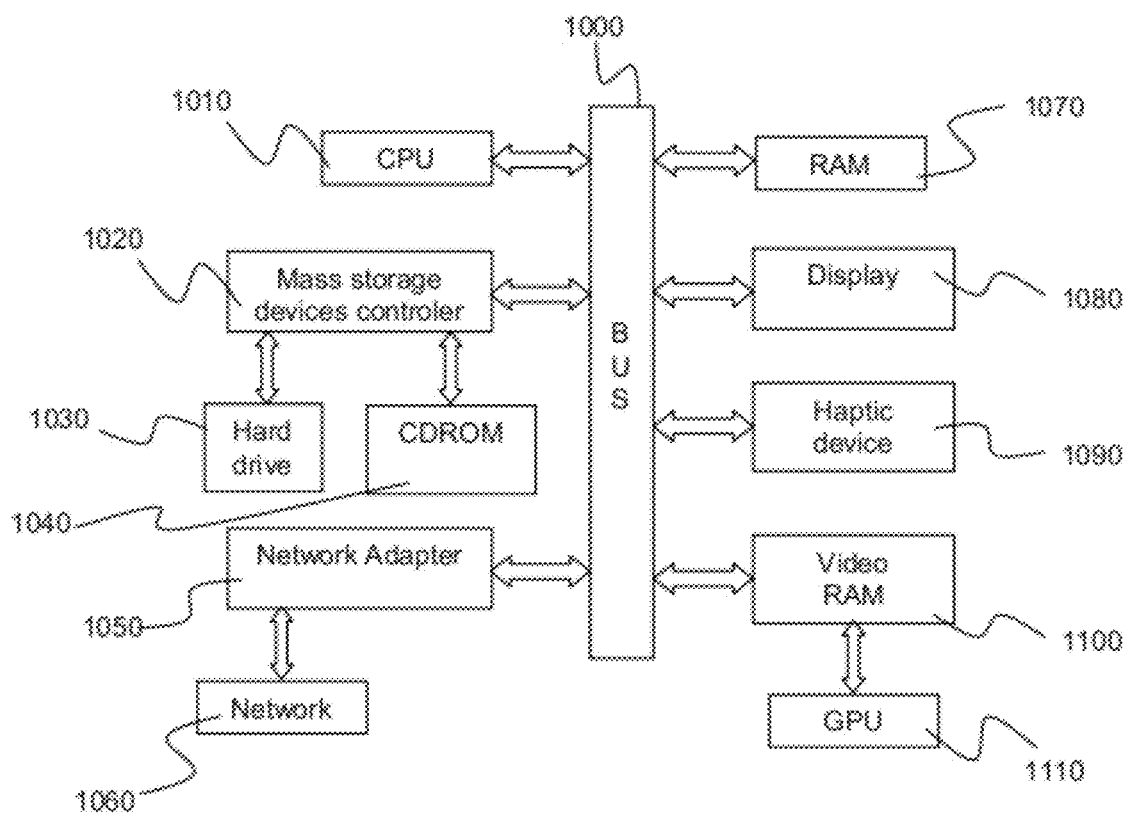
FIG. 75 shows an example of a client computer system.

FIG. 75 shows a client computer system, e.g. a workstation of a user.

The client computer comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080, as mentioned with reference to FIG. 74. In addition, the cursor control device allows the user to select various commands, and input control signals. The cursor control device includes a number of signal generation devices for input control signals to system. Typically, a cursor control device may be a mouse, the button of the mouse being used to generate the signals.

The invention claimed is:

1. A computer-implemented method for updating a 3D model, the method comprising:
by a computer device with a processor, associated memory, and a graphical user interface, the processor:
storing in the associated memory, a 3D model, said storing includes storing a history of the 3D model having undergone one or more operations and graphs linked to different points of the history;
retrieving from the associated memory, at least two graphs of the stored graphs linked to the different points of the history, including:
an old input graph of the 3D model before undergoing an operation of the one or more operations, and
an old output graph of the 3D model corresponding to an application of the operation to the old input graph;
generating a new input graph of the operation, wherein the new input graph is generated as a result of a modification of the 3D model, the modification being requested by a user via the graphical user interface;
computing a double push-out rewriting rule that specifies: (i) a part of the old input graph to be replaced, (ii) a part of the new input graph to replace the part of the old input graph, and (iii) an interface which is a part common to the part of the old input graph, the part of the new input graph, and the old output graph, the rewriting rule corresponding to logical operations which are computed based on the old input graph, the old output graph, and the new input graph; and
applying the rewriting rule directly on the old output graph, such that the old output graph is transformed to a new output graph that represents an updated state of the 3D model as updated by the modification.

2. The method of claim 1, wherein the method further comprises:
(a) computing a second rewriting rule that specifies: (i) a second part of the old input graph to be replaced, (ii) a part of the old output graph to replace the second part of the old input graph, and (iii) a second interface which is a part common to the second part of the old input graph and the part of the old output graph, the second rewriting rule corresponding to logical operations which are computed based on the old input graph and the old output graph, and
(b) testing that the rewriting rule and the second rewriting rule are commutative before applying the rewriting rule to the old output graph.

3. The method of claim 2, wherein the testing is performed by comparing a first intersection between the part of the old input graph and the second part of the old input graph to a second intersection between the interface and the second interface, the rewriting rule and the second rewriting rule being commutative when the first and second intersections are equal.

4. The method of claim 1, wherein nodes of the old input graph, of the new input graph, and of the old output graph point to geometric data.

5. The method of claim 4, wherein the old input graph, the new input graph, and the old output graph are at least sub-graphs of boundary-representation graphs.

6. The method of claim 5, wherein the old input graph, the new input graph, and the old output graph are face-edge graphs or edge-vertex sub-graphs of boundary-representation graphs.

7. The method of claim 6, wherein the old input graph, the new input graph, and the old output graph are edge-vertex sub-graphs of boundary-representation graphs, and the method further comprises, prior to applying the rewriting rule:
retrieving from the associated memory,
an old face-edge input graph of the 3D model before undergoing the operation, the old face-edge input graph being a sub-graph of the boundary-representation graph of which the old input graph is a sub-graph,
an old face-edge output graph of the 3D model corresponding to an application of the operation to the old face-edge input graph, the old face-edge output graph being a sub-graph of the boundary-representation graph of which the old output graph is a sub-graph, and
a new face-edge input graph of the 3D model undergoing the operation, the new face-edge input graph being a sub-graph of the boundary-representation graph of which the new input graph is a sub-graph;
computing a face-edge rewriting rule that specifies a part of the old face-edge input graph to be replaced, a part of the new face-edge input graph to replace the specified part of the old face-edge input graph, and a face-edge interface which is a part common to the specified part of the old face-edge input graph, the specified part of the new face-edge input graph, and the old face-edge output graph, the face-edge rewriting rule corresponding to logical operations which are computed based on the old face-edge input graph, the old face-edge output graph, and the new face-edge input graph;
computing a second face-edge rewriting rule that specifies a second part of the old face-edge input graph to be replaced, a part of the old face-edge output graph to replace the second part of the old face-edge input graph, and a second face-edge interface which is a part common to the second part of the old face-edge input graph and the part of the old face-edge output graph, the second face-edge rewriting rule corresponding to logical operations which are computed based on the old face-edge input graph and the old face-edge output graph; and
testing that the face-edge rewriting rule and the second face-edge rewriting rule are not commutative.

8. The method of claim 2, wherein the method further comprises testing for 3D compatibility between a volume corresponding to the part of the new input graph and a volume corresponding to the part of the old output graph.

9. The method of claim 1, wherein the operation is a filleting or a rounding operation.

10. The method of claim 1, wherein the steps of retrieving graphs, including the old input graph and the old output graph, generating the new input graph, and computing the rewriting rule are iterated over historical operations of the 3D model, wherein the operation of each iteration being a respective historical operation.

11. A history-based computer-aided design system comprising:
   a) a computer memory holding a database storing a 3D model, the database containing:
      a history of the 3D model having undergone one or more operations, and
      graphs linked to different points of the history;
   b) a processor communicatively coupled to the computer memory and configured to retrieve from the database, at least two graphs of the stored graphs linked to different points of the history including:
      an old input graph of the 3D model before undergoing an operation of the one or more operations, and
      an old output graph of the 3D model corresponding to an application of the operation to the old input graph, and
   c) a graphical user interface operatively coupled to the processor, wherein the processor is further configured to:
      allow generation of a new input graph of the operation, wherein the new input graph is generated as a result of a modification of the 3D model, the modification being requested by a user via the graphical user interface;
      compute a double push-out rewriting rule that specifies: (i) a part of the old input graph to be replaced, (ii) a part of the new input graph to replace the part of the old input graph, and (iii) an interface which is a part common to the part of the old input graph, the part of the new input graph, and the old output graph, the rewriting rule corresponding to logical operations which are computed based on the old input graph, the old output graph, and the new input graph, and
      apply the rewriting rule directly on the old output graph, such that the old output graph is transformed to a new output graph and represents the 3D model as updated by the modification.

12. A non-transitory computer readable storage medium comprising:
   a computer memory device having recorded thereon a computer program comprising instructions for execution by a computer, the computer when executing the instructions responsively updates a 3D model,
   wherein the instructions comprise:
      storing the 3D model in associated memory of a CAD system, said storing includes storing a history of the 3D model having undergone one or more operations and graphs linked to different points of the history;
      retrieving from the associated memory, at least two graphs of the stored graphs linked to the different points of the history, including:
         an old input graph of the 3D model before undergoing an operation of the one or more operations, and
         an old output graph of the 3D model corresponding to an application of the operation to the old input graph;
      generating a new input graph of the operation, wherein the new input graph is generated as a result of a modification of the 3D model, the modification being requested by a user via a graphical user interface;
      computing a double push-out rewriting rule that specifies (i) a part of the old input graph to be replaced, (ii) a part of the new input graph to replace the part of the old input graph, and (iii) an interface which is a part common to the part of the old input graph, the part of the new input graph, and the old output graph, the rewriting rule corresponding to logical operations which are computed based on the old input graph, the old output graph, and the new input graph; and
      applying the rewriting rule directly on the old output graph, resulting in transforming the old output graph to a new output graph representing an updated state of the 3D model as updated by the modification.

* * * * *